(12) United States Patent
Chen et al.

(10) Patent No.: US 11,906,890 B2
(45) Date of Patent: Feb. 20, 2024

(54) LASER PROJECTION APPARATUS

(71) Applicant: HISENSE LASER DISPLAY CO., LTD, Shandong (CN)

(72) Inventors: Xu Chen, Shandong (CN); Jichen Xiao, Shandong (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 0 days.

(21) Appl. No.: 18/143,398

(22) Filed: May 4, 2023

(65) Prior Publication Data

US 2023/0273514 A1 Aug. 31, 2023

Related U.S. Application Data

(63) Continuation of application No. 17/380,335, filed on Jul. 20, 2021, now Pat. No. 11,669,005, which is a
(Continued)

(30) Foreign Application Priority Data

Dec. 19, 2019 (CN) .......................... 201911315032.X
Dec. 19, 2019 (CN) .......................... 201911315259.4

(51) Int. Cl.
*G03B 21/20* (2006.01)
*G02B 26/02* (2006.01)
(Continued)

(52) U.S. Cl.
CPC ........... *G03B 21/208* (2013.01); *G02B 26/02* (2013.01); *G03B 21/16* (2013.01);
(Continued)

(58) Field of Classification Search
CPC .. G03B 21/208; G03B 21/16; G03B 21/2013; G03B 21/2033; H02P 27/08
See application file for complete search history.

(56) References Cited

U.S. PATENT DOCUMENTS

| 2002/0003512 A1 | 1/2002 | Ohara et al. |
| 2004/0169774 A1 | 9/2004 | Hibi et al. |
(Continued)

FOREIGN PATENT DOCUMENTS

| CN | 1306375 A | 8/2001 |
| CN | 1520193 A | 8/2004 |
(Continued)

OTHER PUBLICATIONS

International Search Report and Written Opinion dated Mar. 17, 2021 in corresponding International Application No. PCT/CN2020/137412, translated, 20 pages.
(Continued)

*Primary Examiner* — Jerry L Brooks
(74) *Attorney, Agent, or Firm* — MH2 TECHNOLOGY LAW GROUP LLP

(57) ABSTRACT

A laser projection apparatus includes a main control circuit, a diffusion wheel driving circuit and a temperature sensor. The temperature sensor is electrically connected to the main control circuit, and configured to detect an ambient temperature. The main control circuit is configured to: determine a target starting current according to the ambient temperature; determine a duty cycle of a second startup pulse width modulation signal according to the target starting current, and provide the second startup pulse width modulation signal to the diffusion wheel driving circuit; and output an operating pulse width modulation signal to the diffusion wheel driving circuit when the diffusion wheel reaches a target rotation speed. The target starting current is a minimum drive current required to drive the motor from standstill to starting to rotate. The target rotation speed is a preset speed at which the diffusion wheel operates normally and speckles are eliminated.

20 Claims, 15 Drawing Sheets

Related U.S. Application Data continuation-in-part of application No. PCT/CN2020/137412, filed on Dec. 17, 2020.

(51) Int. Cl.
*G03B 21/16* (2006.01)
*H02P 27/08* (2006.01)

(52) U.S. Cl.
CPC ..... *G03B 21/2013* (2013.01); *G03B 21/2033* (2013.01); *H02P 27/08* (2013.01)

(56) References Cited

U.S. PATENT DOCUMENTS

| | | | |
|---|---|---|---|
| 2018/0267395 | A1 | 9/2018 | Yamada |
| 2018/0364554 | A1 | 12/2018 | Ogawa |
| 2019/0043431 | A1 | 2/2019 | Nakajima |

FOREIGN PATENT DOCUMENTS

| | | | |
|---|---|---|---|
| CN | 101093985 | A | 12/2007 |
| CN | 101285995 | A | 10/2008 |
| CN | 102520568 | A | 6/2012 |
| CN | 103036484 | A | 4/2013 |
| CN | 103442478 | A | 12/2013 |
| CN | 103456599 | A | 12/2013 |
| CN | 103715946 | A | 4/2014 |
| CN | 105828055 | A | 8/2016 |
| CN | 106354241 | A | 1/2017 |
| CN | 106788124 | A | 5/2017 |
| CN | 107191406 | A | 9/2017 |
| CN | 108563089 | A | 9/2018 |
| CN | 109100909 | A | 12/2018 |
| CN | 109389955 | A | 2/2019 |
| CN | 109489207 | A | 3/2019 |
| CN | 209373343 | U | 9/2019 |
| CN | 110543075 | A | 12/2019 |
| CN | 111025832 | A | 4/2020 |
| CN | 111312125 | A | 6/2020 |
| CN | 111312126 | A | 6/2020 |
| JP | 2008293731 | A | 12/2008 |

OTHER PUBLICATIONS

First Chinese Office Action dated Feb. 3, 2021 in corresponding Chinese Application No. 201911315032.X, translated, 13 pages.
Chinese Notification to Grant Patent Right for Invention dated Oct. 22, 2021 in corresponding Chinese Application No. 201911315032.X, translated, 9 pages.
First Chinese Office Action dated Feb. 3, 2021 in corresponding Chinese Application No. 201911315259.4, translated, 13 pages.
Chinese Notification to Grant Patent Right for Invention dated Oct. 22, 2021 in corresponding Chinese Application No. 201911315259.4, translated, 7 pages.
Notice of Allowance dated Feb. 2, 2023 in corresponding U.S. Appl. No. 17/380,335, 17 pages.
Corrected Notice of Allowance dated Mar. 1, 2023 in corresponding U.S. Appl. No. 17/380,335, 8 pages.

LASER PROJECTION APPARATUS

CROSS-REFERENCE TO RELATED APPLICATIONS

This application is a continuation application of U.S. patent application Ser. No. 17/380,335, filed on Jul. 20, 2021, pending, which is a continuation-in-part application of International Application No. PCT/CN2020/137412, filed Dec. 17, 2020, expired, which claims priority to Chinese Patent Application No. 201911315032.X, filed on Dec. 19, 2019 and Chinese Patent Application No. 201911315259.4, filed on Dec. 19, 2019, which are incorporated herein by reference in their entirety.

TECHNICAL FIELD

The present disclosure relates to the field of laser projection display, and in particular, to a laser projection apparatus.

BACKGROUND

A laser projection apparatus usually includes a light source system, an illumination system, and a lens system. The light source system is used to provide a laser beam, the illumination system is used to modulate the laser beam into an image light beam, and the lens system is used to project the image light beam onto a projection screen.

SUMMARY

A laser projection apparatus is provided. The laser projection apparatus includes a laser light source, a light combining mirror group, an optical path shaping lens, a diffusion wheel, a light collecting device, a light valve, a projection lens, a main control circuit, a diffusion wheel driving circuit and a temperature sensor. The laser light source is configured to emit laser beams of three colors. The combining mirror group is configured to combine the laser beams of three colors. The optical path shaping lens is configured to shape a light path of the combined laser beams. The combined laser beams are transmitted to the optical path shaping lens and then incident to the diffusion wheel. The diffusion wheel is configured to homogenize the laser beams and then transmit the laser beams to the light collecting device. The light valve is configured to modulate light of each color into an image light beam and transmit the image light beam to the projection lens. The projection lens is configured to project the image light beam onto a projection screen. The diffusion wheel includes a motor and a diffusion portion. The motor is a three-phase motor. The temperature sensor is electrically connected to the main control circuit, and configured to detect an ambient temperature. The main control circuit is configured to: determine a target starting current according to the ambient temperature; determine a duty cycle of a second startup pulse width modulation signal according to the target starting current, and provide the second startup pulse width modulation signal to the diffusion wheel driving circuit; and output an operating pulse width modulation signal to the diffusion wheel driving circuit when the diffusion wheel reaches a target rotation speed. The target starting current is a minimum drive current required to drive the motor from standstill to starting to rotate. The target rotation speed is a preset speed at which the diffusion wheel operates normally and speckles are eliminated. The diffusion wheel driving circuit is configured to drive the three-phase motor to drive the diffusion portion in response to each of the second startup pulse width modulation signal and the operating pulse width modulation signal.

BRIEF DESCRIPTION OF THE DRAWINGS

In order to describe technical solutions in embodiments of the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

In order to make the purposes, technical solutions, and advantages of the embodiments of the present disclosure clearer, implementation manners of the present disclosure will be further explained in detail below with reference to the accompanying drawings.

Unless the context requires otherwise, throughout the description and the claims, the term "comprise" and other forms thereof such as the third-person singular form "comprises" and the present participle form "comprising" are construed as an open and inclusive meaning, i.e., "included, but not limited to." In the description, the terms such as "one embodiment," "some embodiments," "exemplary embodiments," "example," "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, terms such as "first" or "second" are only used for descriptive purposes and are not to be construed as indicating or implying the relative importance or implicitly indicating the number of indicated technical features below. Thus, features defined as "first" or "second" may explicitly or implicitly include one or more of the features. In the description of the embodiments of the present disclosure, "a plurality of", "the plurality of" or "multiple" means two or more unless otherwise specified.

Some embodiments may be described using the expression "coupled" and "connected" along with their derivatives. For example, the term "connected" may be used in the description of some embodiments to indicate that two or more components are in direct physical or electrical contact. However, the term "connected" may also mean that two or more components are not in direct contact with each other, but yet still cooperate or interact with each other. The embodiments disclosed herein are not necessarily limited to the contents herein.

The use of "configured to" herein is meant as open and inclusive language that does not foreclose devices configured to perform additional tasks or steps.

Additionally, the use of "based on" is meant to be open and inclusive, in that a process, step, calculation, or other action "based on" one or more recited conditions or values may, in practice, be based on additional conditions or value beyond those recited.

Figure 1A:
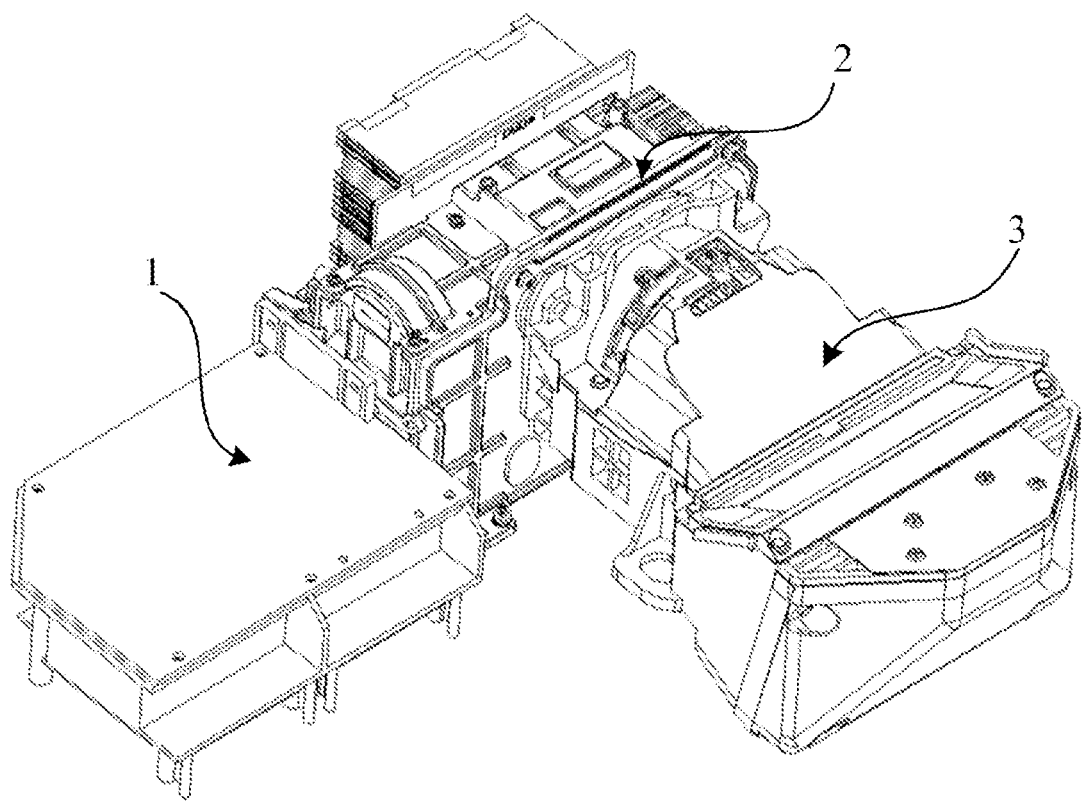
FIG. 1A is a structural diagram of a laser projection apparatus, in accordance with some embodiments.

FIG. 1A shows a schematic structural diagram of a laser projection apparatus, in accordance with some embodiments. As shown in FIG. 1A, based on an optical function, the laser projection apparatus includes a light source 1, a light machine 2, and a lens 3. The light source 1 is configured to provide laser beams of three colors. The light machine 2 includes a front end of an optical path portion configured to combine and shape the laser beams provided by the light source 1. A rear end of the optical path portion is a digital micromirror device (DMD) chip. In digital light processing (DLP) projection architecture, the DMD chip is a core light modulation device. The DMD chip receives a driving signal (i.e., a shaped light beam) corresponding to an image signal, and flips thousands of tiny mirrors included therein at a positive or negative angle corresponding to the drive signal, so as to reflect the light beam irradiating a surface thereof into the lens 3. The lens 3 may be an ultra-short-focus projection lens. The ultra-short-focus projection lens 3 is configured to project the light beam onto a projection screen, so that the laser projection apparatus realizes projected image display.

Figure 1B:
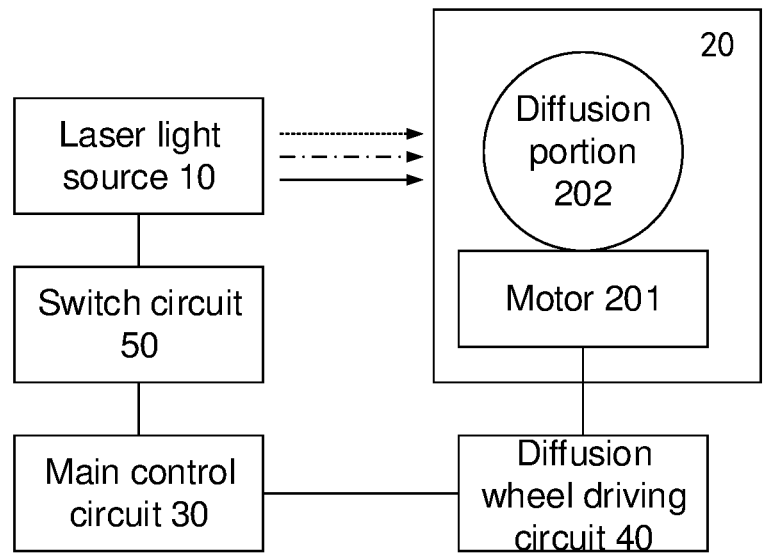
FIG. 1B is a block diagram of the laser projection apparatus in FIG. 1A, in accordance with some embodiments.

FIG. 1B shows a block diagram of the laser projection apparatus in FIG. 1A, in accordance with some embodiments. As shown in FIG. 1B, the laser projection apparatus includes a laser light source 10, a diffusion wheel 20, a main control circuit 30, a diffusion wheel driving circuit 40, and a switch circuit 50.

The diffusion wheel 20 includes a motor 201 and a diffusion portion 202 connected to the motor 201. The main control circuit 30 is electrically connected to the diffusion wheel driving circuit 40 and the switch circuit 50, the diffusion wheel driving circuit 40 is further electrically connected to the motor 201, and the switch circuit 50 is further electrically connected to the laser light source 10.

Figure 2:
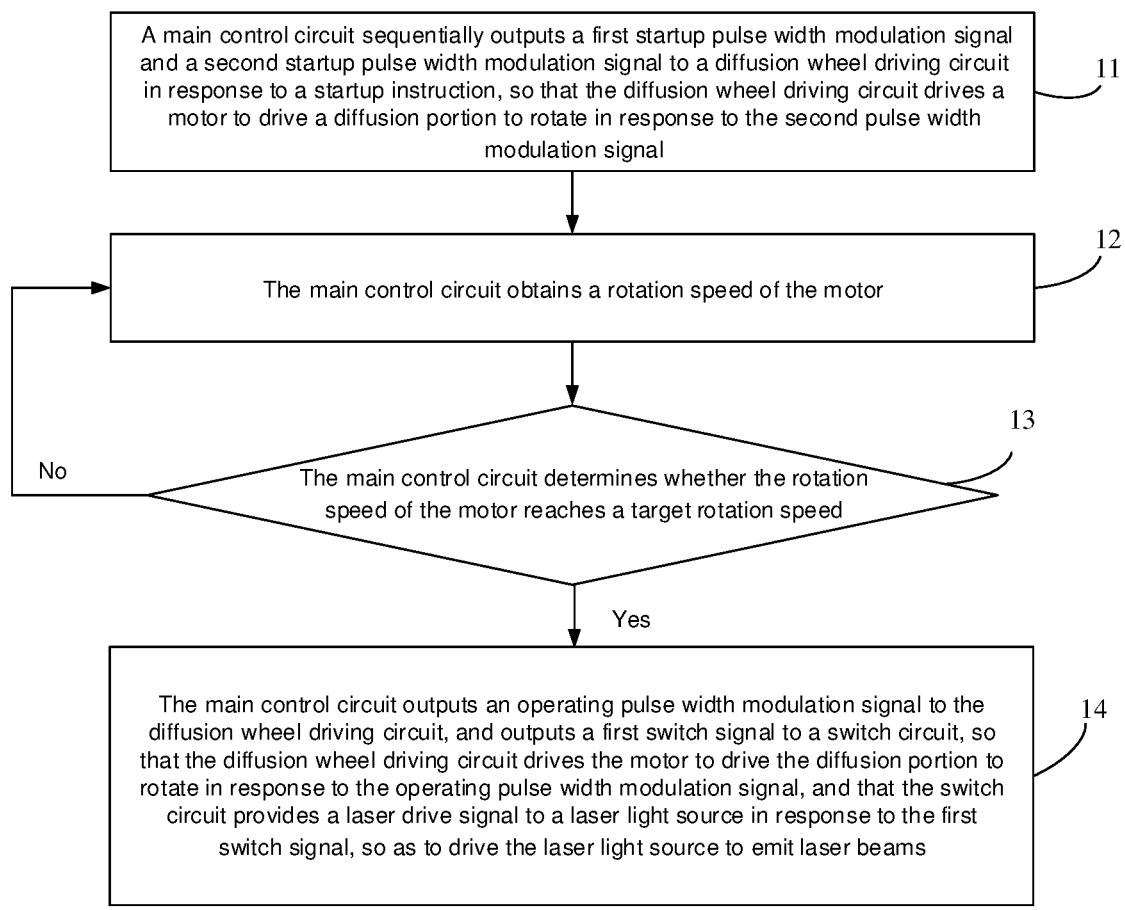
FIG. 2 is a flow diagram of a control method of a laser projection apparatus, in accordance with some embodiments.

FIG. 2 is a flow diagram of a control method of the laser projection apparatus, in accordance with some embodiments. The control method may be performed at the main control circuit of the laser projection apparatus, for example, the main control circuit 30 of the laser projection apparatus shown in FIG. 1B. The control method will be described below with reference to FIG. 1B. As shown in FIG. 2, the control method includes steps 11 to 14.

In step 11, the main control circuit 30 sequentially outputs a first startup pulse width modulation signal and a second startup pulse width modulation signal to the diffusion wheel driving circuit 40 in response to a startup instruction, so that the diffusion wheel driving circuit 40 drives the motor 201 to drive the diffusion portion 202 to rotate in response to the second pulse width modulation signal.

A duty cycle of the first startup pulse width modulation signal is less than a duty cycle of the second startup pulse width modulation signal.

In step 12, the main control circuit 30 obtains a rotation speed of the motor 201.

In some examples, the diffusion wheel driving circuit 40 generates a frequency signal for instructing the motor 201 to rotate at a certain rotation speed (i.e., a rotation speed of the diffusion wheel 20), and transmit the frequency signal to the main controller circuit 30. Thus, the main control circuit 30 obtains the frequency signal transmitted by the diffusion wheel driving circuit 40, and obtains the rotation speed of the motor 201 based on the frequency signal.

In step 13, the main control circuit 30 determines whether the rotation speed of the motor 201 reaches a target rotation speed.

In step 14, if the rotation speed of the motor 201 reaching the target rotation speed is determined, the main control circuit 30 outputs an operating pulse width modulation signal to the diffusion wheel driving circuit 40, and outputs a first switch signal to the switch circuit 50, so that the diffusion wheel driving circuit 40 drives the motor 201 to drive the diffusion portion 202 to rotate in response to the operating pulse width modulation signal, and that the switch circuit 50 provides a laser drive signal to the laser light source 10 in response to the first switch signal, so as to drive the laser light source 10 to emit laser beams.

If it is determined that the rotation speed of the motor 201 does not reach the target rotation speed, step 12 may be performed again.

The second startup pulse width modulation signal and the operating pulse width modulation signal output by the main control circuit 30 are each used to instruct the diffusion wheel driving circuit 40 to drive the motor 201 to drive the diffusion portion 202 to rotate. The diffusion portion 202 is located in transmission optical paths of the laser beams emitted by the laser light source 10, and may be used to diffuse and homogenize the laser beams. The target rotation speed is a preset rotation speed of the diffusion wheel 20 in normal operation, and the diffusion wheel driving circuit 40 may drive the motor 201 to rotate at the target rotation speed, based on the operating pulse width modulation signal.

For example, the laser drive signal includes an enable signal EN and a brightness adjustment signal. The laser light source 10 may emit the laser beams with a certain light emission timing in response to the enable signal EN. For example, the enable signal EN may determine a time when a laser beam of a respective color is output. The laser light source 10 may emit a laser beam with a certain light emission brightness in response to the brightness adjustment signal. The brightness adjustment signal may be a pulse width modulation (PWM) signal.

Figure 3:
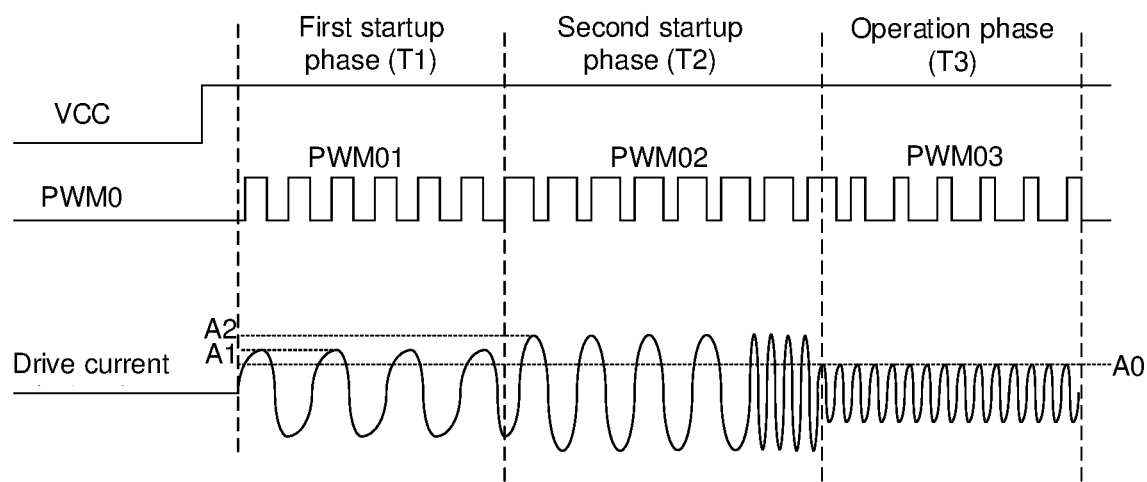
FIG. 3 is a timing diagram of a pulse width modulation signal output by a main control circuit in a control process of a laser projection apparatus, in accordance with some embodiments.

Referring to FIG. 3, during a startup process of the laser projection apparatus, processes of the main control circuit 30 driving the diffusion wheel driving circuit 40 may include processes in a first startup phase T1, a second startup phase T2, and an operation phase T3.

In the first startup phase T1, the main control circuit 30 provides the first startup pulse width modulation signal PWM01 to the diffusion wheel driving circuit 40.

For example, after detecting the startup instruction, the main control circuit 30 may first power on the diffusion wheel driving circuit 40 through a first power supply terminal VCC, and then provide the first startup pulse width modulation signal PWM01 to the diffusion wheel driving circuit 40.

In the second startup phase T2, the main control circuit 30 provides the second startup pulse width modulation signal PWM02 to the diffusion wheel driving circuit 40.

In this case, the diffusion wheel driving circuit 40 drives the motor 201 to drive the diffusion portion 202 to rotate in response to the second startup pulse width modulation signal PWM02.

In the operation phase T3, the main control circuit 30 obtains the rotation speed of the motor 201 and determines whether the rotation speed of the motor 201 reaches the target rotation speed. If the rotation speed of the motor 201 reaches the target rotation speed, the main control circuit 30 provides the operating pulse width modulation signal PWM03 to the diffusion wheel driving circuit 40, and provides the first switch signal to the switch circuit 50.

In this case, the diffusion wheel driving circuit 40 drives the motor 201 to drive the diffusion portion 202 to rotate in response to the operating pulse width modulation signal PWM03, and the switch circuit 50 provides the laser drive signal to the laser light source 10 in response to the first switch signal, so as to drive the laser light source 10 to emit the laser beams.

A duty cycle of the second startup pulse width modulation signal PWM02 is greater than a duty cycle of the first startup pulse width modulation signal PWM01, and the duty cycle of the first startup pulse width modulation signal PWM01 may be greater than a duty cycle of the operating pulse width modulation signal PWM03.

In this case, the diffusion wheel driving circuit 40 may provide a drive current to the motor 201 based on the pulse width modulation signal (e.g., the second startup pulse width modulation signal or the operating pulse width modulation signal) provided by the main control circuit 30. A magnitude of the drive current provided by the diffusion wheel driving circuit 40 to the motor 201 is proportional to the duty cycle of the pulse width modulation signal (e.g., the second startup pulse width modulation signal or the operating pulse width modulation signal) provided by the main control circuit 30. That is, the greater the duty cycle of the pulse width modulation signal, the greater the drive current provided by the diffusion wheel driving circuit 40 to the motor 201, and the faster the rotation speed of the motor 201.

Referring to FIG. 3, in a process that the main control circuit 30 provides a signal to the diffusion wheel driving circuit 40, the main control circuit 30 first provides the first startup pulse width modulation signal PWM01 with a relatively small duty cycle to the diffusion wheel driving circuit 40. The diffusion wheel driving circuit 40 may provide a relatively small drive current A1 to the motor 201 in response to the first startup pulse width modulation signal PWM01, so that the motor 201 is driven but not rotates, which is equivalent to a case that the motor 201 is in a soft start phase. After that, the main control circuit 30 provides the second startup pulse width modulation signal PWM02 with a relatively large duty cycle to the diffusion wheel driving circuit 40, and the diffusion wheel driving circuit 40 provides a relatively large drive current A2 to the motor 201 in response to the second startup pulse width modulation signal PWM02. The drive current A2 may be a minimum drive current required to drive the motor 201 from standstill to starting to rotate, and may also be referred to as a target starting current.

The drive current A1 in the first startup phase T1 and the drive current A2 in the second startup phase T2 may satisfy: $A2 = k \times A1$, and k is a preset scale factor, which is a positive integer greater than 1, for example, 3 or 4.

In this case, the duty cycles of the pulse width modulation signals (i.e., the first startup pulse width modulation signal PWM01 and the second startup pulse width modulation signal PWM02) sequentially provided by the main control circuit 30 change from small to large, and an amplitude of the drive current provided by the diffusion wheel driving circuit 40 to the motor 201 also changes from small to large, so that the rotation speed of the motor 201 continues to increase. When the rotation speed of the motor 201 reaches the target rotation speed, the motor 201 will enter a state of stable operation. During the stable operation of the motor 201, a frequency (or period) of a drive current A0 provided by the diffusion wheel driving circuit 40 to the motor 201 tends to stabilize, and an amplitude of the drive current A0 returns to a value of the minimum drive current required for the motor 201 to rotate at the target rotation speed. The amplitude of the drive current A0 is less than an amplitude of the target starting current A2.

During the startup process of the laser projection apparatus, noise is mainly caused by a large drive current required for starting the motor 201 and a long duration of the startup phase. However, in the embodiments of the present disclosure, a soft start process of the first startup phase T1 is added. Therefore, the duty cycle of the pulse width modulation signal may be controlled, so that the drive current in the startup phase slowly transitions to the target starting current A2 according to a sine wave. Finally, a duration of an effective value of the target starting current A2 is made sufficiently small, so as to effectively reduce the noise of the motor 201 in the startup process.

In summary, in the control method of the laser projection apparatus provided by the embodiments of the present disclosure, during the startup process, the main control circuit 30 first provides the first startup pulse width modulation signal with a relatively small duty cycle to the diffusion wheel driving circuit 40, and then provides the second startup width modulation signal with a relatively large duty cycle to the diffusion wheel driving circuit 40. The second startup pulse width modulation signal may ensure that the motor 201 of the diffusion wheel 20 is started normally. Since the diffusion wheel driving circuit 40 may slowly start the motor 201 based on the first startup pulse width modulation signal with a small duty cycle during the startup process, a duration for the main control circuit 30 to provide the second startup pulse width modulation signal with a large duty cycle to the diffusion wheel driving circuit 40 is reduced, that is, a duration for the diffusion wheel driving circuit 40 to provide a large drive current to the motor 201 is reduced. Further, a startup efficiency is ensured, and the noise of the motor 201 in the startup process is effectively reduced, that is, the laser projection apparatus may achieve a high startup efficiency and low startup noise.

Figure 4:
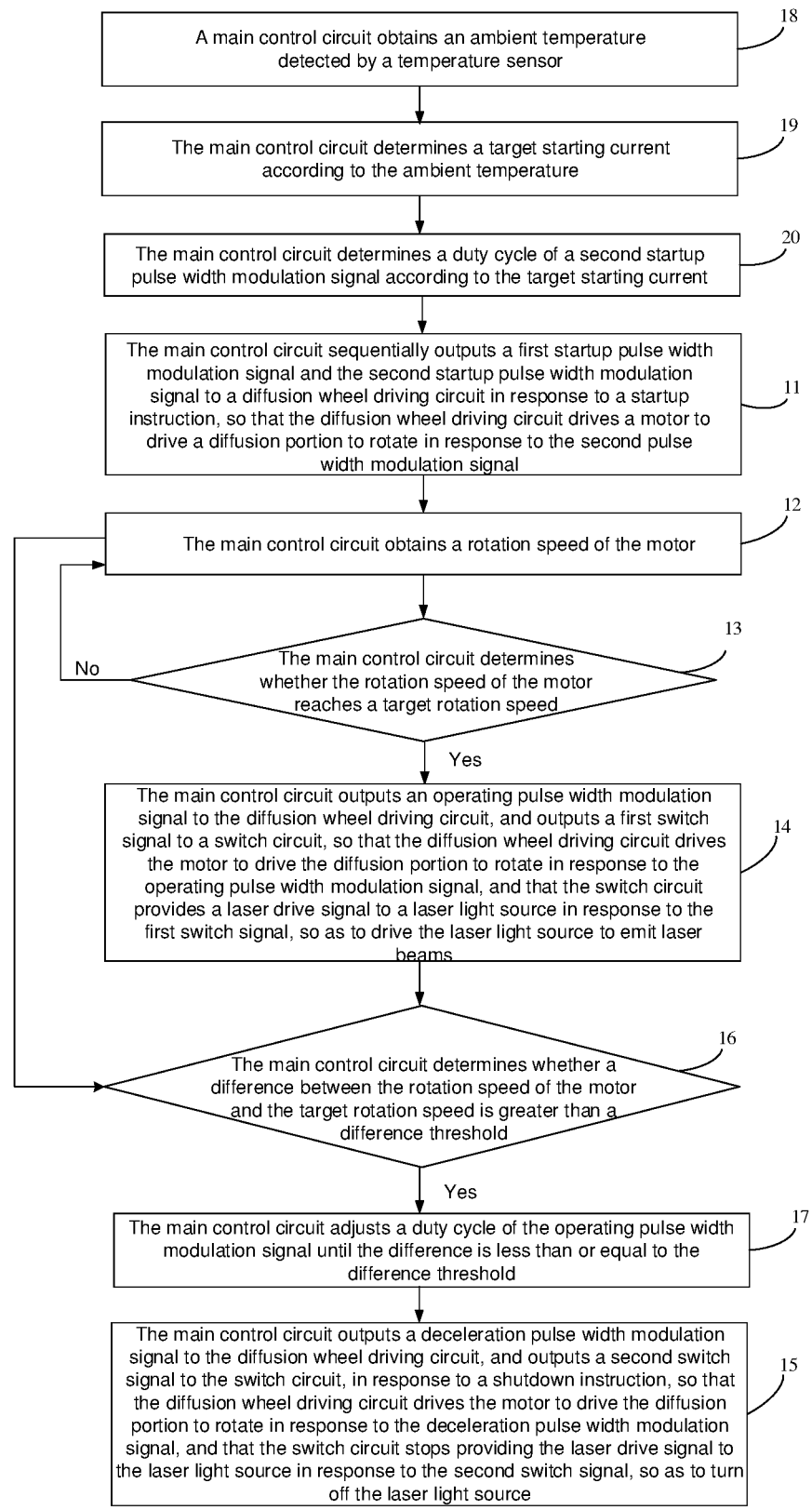
FIG. 4 is a flow diagram of another control method of a laser projection apparatus, in accordance with some embodiments.

FIG. 4 is a flow diagram of another control method of the laser projection apparatus, in accordance with some embodiments of the present disclosure. As shown in FIG. 4, after the step 14, the control method may further include step 15.

In step 15, in response to a shutdown instruction, the main control circuit 30 outputs a deceleration pulse width modulation signal to the diffusion wheel driving circuit 40, and outputs a second switch signal to the switch circuit 50, so that the diffusion wheel driving circuit 40 drives the motor 201 to drive the diffusion portion 202 to rotate in response to the deceleration pulse width modulation signal, and that the switch circuit 50 stops providing the laser drive signal to the laser light source 10 in response to the second switch signal, so as to turn off the laser light source 10.

A duty cycle of the deceleration pulse width modulation signal is less than the duty cycle of the operating pulse width modulation signal.

Figure 5:
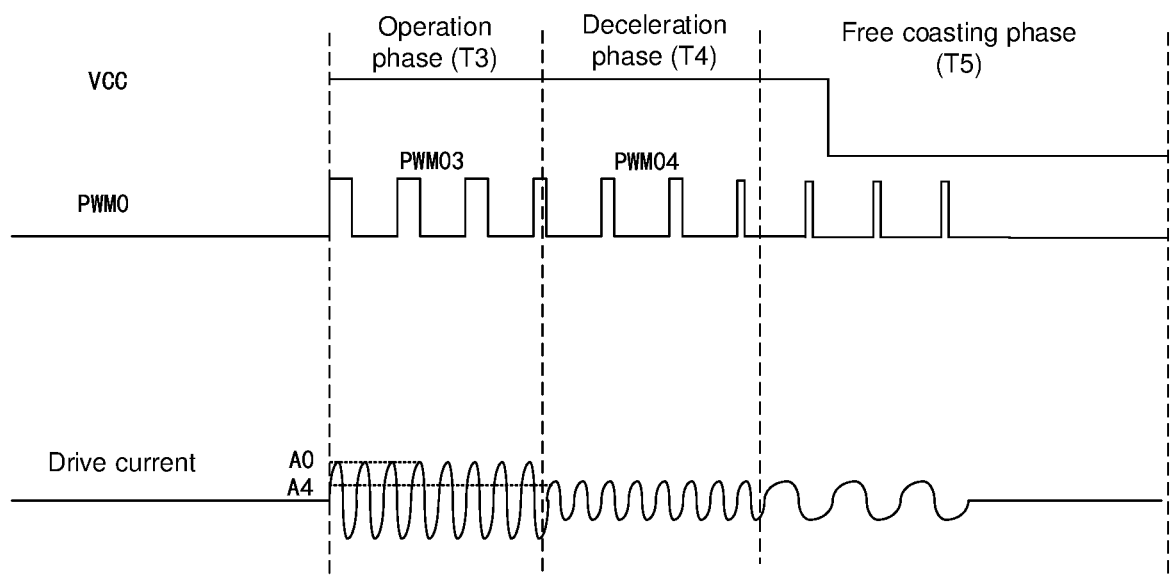
FIG. 5 is a timing diagram of a pulse width modulation signal output by a main control circuit in a control process of a laser projection apparatus, in accordance with some embodiments.

Referring to FIG. 5, during a shutdown process of the laser projection apparatus, a process of the main control circuit 30 driving the diffusion wheel driving circuit 40 may include: in a deceleration phase T4, in response to the shutdown instruction, providing, by the main control circuit 30, the deceleration pulse width modulation signal PWM04 to the diffusion wheel driving circuit 40, and outputting, by the main control circuit 30, the second switch signal to the switch circuit 50.

The diffusion wheel driving circuit 40 drives the motor 201 to drive the diffusion portion 202 to rotate in response to the deceleration pulse width modulation signal PWM04. Since the duty cycle of the deceleration pulse width modulation signal PWM04 is less than the duty cycle of the operating pulse width modulation signal PWM03, the drive current provided by the diffusion wheel driving circuit 40 to the motor 201 in response to the deceleration pulse width modulation signal PWM04 is less than the drive current provided by the diffusion wheel driving circuit 40 to the motor 201 in response to the operating pulse width modulation signal PWM03, so that the rotation speed of the motor 201 is reduced, and the rotation speed of the diffusion portion 202 is also reduced. The switch circuit 50 stops providing the laser drive signal to the laser light source 10 in response to the second switch signal, so that the laser light source 10 is turned off.

In some examples, after detecting the shutdown instruction, the main control circuit 30 may first adjust the duty cycle of the pulse width modulation signal provided to the diffusion wheel driving circuit 40, and then stop supplying power to the diffusion wheel driving circuit 40 through the first power supply terminal VCC. Thus, it is possible to ensure that a shutdown process of the diffusion wheel driving circuit 40 is controlled by the pulse width modulation signal (e.g., the deceleration pulse width modulation signal) provided by the main control circuit 30.

In the embodiments of the present disclosure, the drive current provided by the diffusion wheel driving circuit 40 to the motor 201 first transitions from the drive current A0 in a stable state to a drive current A4 in a deceleration state, and then slowly transitions from the drive current A4 in the deceleration state to zero according to a sine wave. In this way, the rotation speed of the motor 201 may be reduced from a high rotation speed to a low rotation speed, and then freely coast from the relatively low rotation speed to a stationary state. Therefore, the duration of the drive current A0 may be effectively reduced, thereby improving a shutdown efficiency of the laser projection apparatus, and reducing the noise of the motor 201 in the shutdown process. As a result, it is possible to enable the laser projection apparatus to achieve a high shutdown efficiency and low shutdown noise.

In some embodiments, as shown in FIG. 5, after the deceleration phase T4, the control method further includes: in a free coasting phase T5, controlling, by the main control circuit 30, the diffusion wheel driving circuit 40 to stop providing the motor 201 with the drive current. Therefore, in the free coasting phase T5, the motor 201 may freely coast to the stationary state. In the free coasting phase T5, the main control circuit 30 may stop providing the diffusion wheel driving circuit 40 with the pulse width modulation signal; or may first provide the diffusion wheel driving circuit 40 with the pulse width modulation signal with a small duty cycle, and then stop providing the diffusion wheel driving circuit 40 with the pulse width modulation signal.

It will be noted that in the embodiments of the present disclosure, the durations of the first startup phase T1 and the deceleration phase T4 may be preset. For example, they may be set by a designer based on experience.

In some embodiments, referring to FIG. 4, after the step 14, the control method may further include steps 16 and 17.

In step 16, the main control circuit 30 determines whether a difference between the rotation speed of the motor 201 and the target rotation speed is greater than a difference threshold.

In step 17, if the difference between the rotation speed of the motor 201 and the target rotation speed is greater than the difference threshold, the main control circuit 30 adjusts the duty cycle of the operating pulse width modulation signal until the difference is less than or equal to the difference threshold.

For example, the main control circuit 30 adjusts the duty cycle of the operating pulse width modulation signal, and transmits the adjusted operating pulse width modulation signal to the diffusion wheel driving circuit 40, and the diffusion wheel driving circuit 40 drives the motor 201 to drive the diffusion portion 202 to rotate at an adjusted rotation speed in response to the adjusted operating pulse width modulation signal. The main control circuit 30 obtains the adjusted rotation speed of the motor 201, and determines whether a difference between the adjusted rotation speed of the motor 201 and the target rotation speed is greater than the difference threshold, and if the difference between the adjusted rotation speed of the motor 201 and the target rotation speed is greater than the difference threshold, the main control circuit 30 continues to adjust the duty cycle of the operating pulse width modulation signal until the main control circuit 30 determines that the difference between the rotation speed of the motor 201 and the target rotation speed is less than or equal to the difference threshold.

The difference between the rotation speed of the motor 201 and the target rotation speed may be a value obtained by subtracting a small value from a large value between the rotation speed of the motor 201 and the target rotation speed.

In this way, it is possible to reduce a deviation of the rotation speed of the motor 201 during an operating process after the step 14.

Since the laser beam has high coherence, it will be scattered when irradiating on a rough object. The scattered beams will interfere in the space, and some of the beams in the space will interfere constructively, and some of the beams will interfere destructively, which may result in appearance of granular light and dark spots (i.e., speckles) on the projection screen, thereby affecting a display effect of the laser projection apparatus. When the rotation speed of the diffusion wheel 20 reaches a certain rotation speed, the speckles may be effectively eliminated.

In some embodiments, the target rotation speed may be pre-stored in the main control circuit 30, and is a rotation speed that can ensure that the diffusion wheel 20 effectively eliminates the speckles. The target rotation speed may be set by the designer of the laser projection apparatus based on experience. For example, the target rotation speed may be 7200 r/min, or may be 8500 r/min. The difference threshold may also be pre-stored in the main control circuit 30, and may be set by the designer based on experience. For example, the difference threshold may be 50 r/min.

When the rotation speed of the diffusion wheel 20 is too low, the speckles cannot be effectively eliminated; and when the rotation speed of the diffusion wheel 20 is too high, it will cause excessive operating noise of the motor 201. Therefore, the main control circuit 30 of the laser projection apparatus in the embodiments of the present disclosure may adjust the duty cycle of the operating pulse width modulation signal provided for the diffusion wheel driving circuit 40, so that a difference between the rotation speed of the diffusion wheel 20 and the target rotation speed is less than or equal to the difference threshold. That is, the main control circuit 30, the diffusion wheel driving circuit 40, and the motor 201 in the diffusion wheel 20 may form a closed-loop system, which may control the rotation speed of the diffusion wheel 20 within an appropriate range, so as to ensure that not only does the diffusion wheel 20 effectively eliminate the speckles, but the excessive operating noise of the motor 201 is also avoided.

In addition, in some embodiments, the main control circuit 30 may obtain the difference between the rotation speed of the motor 201 and the target rotation speed at every certain period during the rotation of the diffusion wheel 20, and determine whether the pulse width modulation signal needs to be adjusted based on the difference. In this way, it is possible to reduce an influence of adjustment of the rotation speed of the diffusion wheel 20 on the display effect when the laser projection apparatus displays an image, and reduce the noise.

For example, the target rotation speed is V0, and the difference threshold value is ΔV. If the main control circuit 20 determines that the current rotation speed of the motor 201 (i.e., the diffusion wheel 20) is V1 based on a frequency signal, and |V0−V1|>ΔV, the main control circuit 30 may stabilize the rotation speed of the diffusion wheel 20 within a range of a difference between V0 and ΔV to a sum of V0 and ΔV, i.e., a range of V0−ΔV to V0+ΔV, by adjusting the operating pulse width modulation signal.

Figure 6:
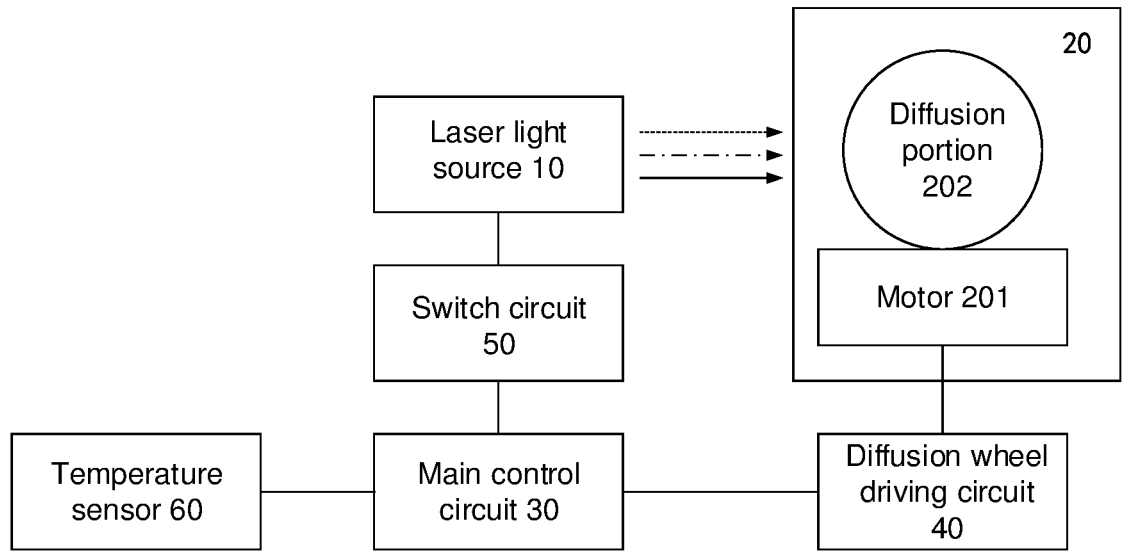
FIG. 6 is a block diagram of the laser projection apparatus in FIG. 1A, in accordance with some other embodiments.

For example, FIG. 6 is a block diagram of another laser projection apparatus, in accordance with some embodiments of the present disclosure. As shown in FIG. 6, the laser projection apparatus may further include a temperature sensor 60. The temperature sensor 60 is electrically connected to the main control circuit 30 and is configured to detect the ambient temperature. Referring to FIG. 4, the control method may further include steps 18 to 20.

In step 18, the main control circuit 30 obtains the ambient temperature detected by the temperature sensor.

In step 19, the main control circuit 30 determines the target starting current according to the ambient temperature.

In step 20, the main control circuit 30 determines the duty cycle of the second startup pulse width modulation signal according to the target starting current.

For example, the main control circuit 30 determines a target duty cycle corresponding to a target starting current A2 based on a corresponding relationship between the starting current and the duty cycle, and generates the second startup pulse width modulation signal PWM02 having the target duty cycle. The main control circuit 30 further determines the drive current A1 in the first startup phase T1 based on the preset scale factor k, and determines the duty cycle of the first startup pulse width modulation signal PWM01. The corresponding relationship between the starting current and the duty cycle may be determined by the designer based on experience.

Figure 7:
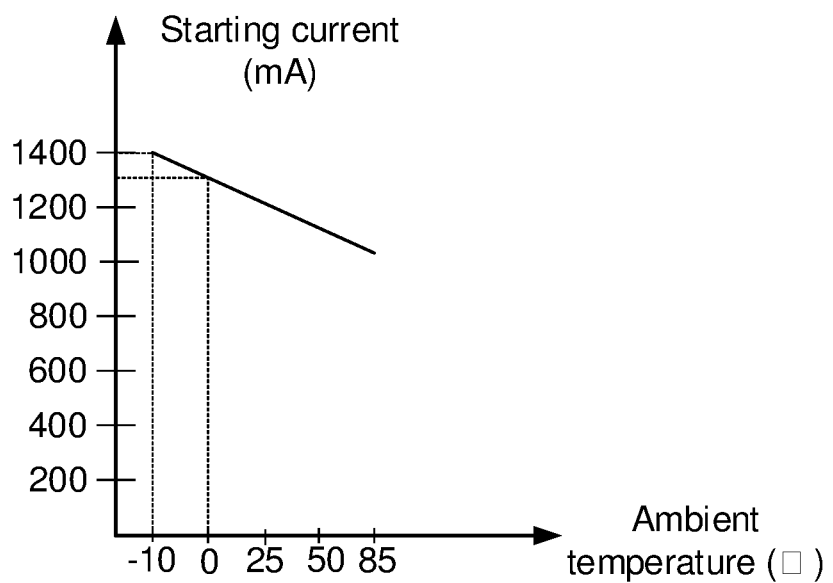
FIG. 7 is a schematic diagram showing a corresponding relationship between an ambient temperature and a starting current, in accordance with some embodiments.

FIG. 7 is a schematic diagram showing a corresponding relationship between the ambient temperature and the starting current, in accordance with some embodiments of the present disclosure. It can be seen from FIG. 7 that the lower the ambient temperature, the greater the starting current required for the motor 201 in the diffusion wheel 20. For example, when the ambient temperature is −10° C., the starting current required for the motor 201 is approximately 1400 mA; and when the ambient temperature is 0° C., the starting current required for the motor 201 is reduced to approximately 1300 mA.

In this case, the main control circuit 30 monitors the ambient temperature of the environment in which the laser projection apparatus is located through the temperature sensor 60, and then determines the appropriate target starting current according to the corresponding relationship between the starting current and the ambient temperature. In this way, it is possible to set different target starting currents in different ambient temperatures, so that vibration, noise and power consumption of the motor are reduced while the motor is started normally, thereby improving the reliability of the laser projection apparatus.

Figure 8:
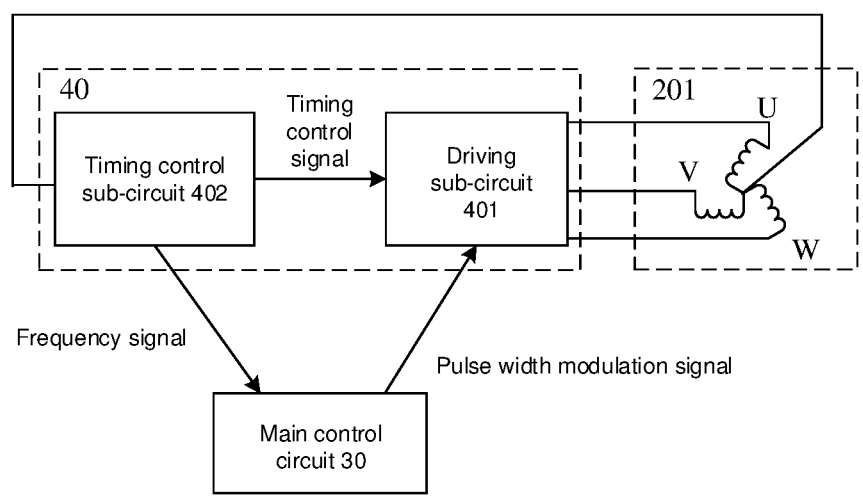
FIG. 8 is a schematic diagram of a diffusion wheel driving circuit, in accordance with some embodiments.

FIG. 8 is a schematic diagram of the diffusion wheel driving circuit, in accordance with some embodiments of the present disclosure. As shown in FIG. 8, the motor 201 may be a three-phase motor. In this case, the diffusion wheel driving circuit 40 may include a driving sub-circuit 401 and a timing control sub-circuit 402. The driving sub-circuit 401 is electrically connected to the main control circuit 30, the timing control sub-circuit 402, and the three-phase motor 201. The timing control sub-circuit 402 is further electrically connected to the three-phase motor 201 and the main control circuit 30.

The driving sub-circuit 401 is configured to provide the drive current to the three-phase motor 201, according to the second startup pulse width modulation signal or the operating pulse width modulation signal provided by the main control circuit 30, and a timing control signal provided by the timing control sub-circuit 402.

The timing control sub-circuit 402 is configured to: obtain three-phase output voltages of the three-phase motor 201; generate the timing control signal and a frequency signal for indicating the rotation speed of the three-phase motor 201, according to the three-phase output voltages; transmit the timing control signal to the driving sub-circuit 401; and transmit the frequency signal to the main control circuit 30.

For example, the timing control sub-circuit 402 may compare the three-phase output voltages of the three-phase motor 201 with a voltage of a common terminal of the three-phase motor 201 to obtain the timing control signal.

For example, the three-phase motor 201 may be a brushless direct current motor (BLDCM). In a process of using the BLDCM to drive the diffusion portion 202 to rotate, the BLDCM may drive the diffusion portion 202 to reach a high target rotation speed, and at the same time, the rotation speed may be divided into 24 gears, so that stepless speed regulation may be realized, and the rotation speed control may be more precise.

Figure 9:
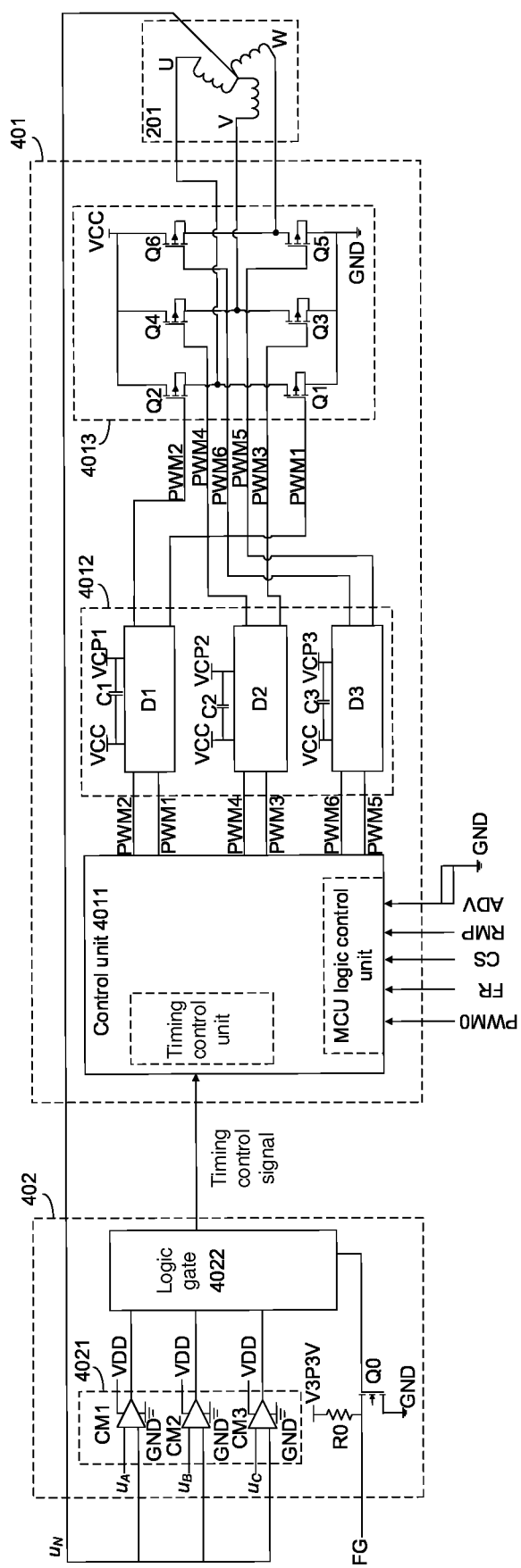
FIG. 9 is a circuit diagram of another diffusion wheel driving circuit, in accordance with some embodiments.

FIG. 9 is a schematic diagram showing a structure of another diffusion wheel driving circuit, in accordance with some embodiments of the present disclosure. As shown in FIG. 9, the driving sub-circuit 401 may include a control unit 4011, a pre-driving unit 4012, and a switch unit 4013.

The control unit 4011 is electrically connected to the main control circuit 30, the timing control sub-circuit 402, and the pre-driving unit 4012. The pre-driving unit 4012 is electrically connected to the switch unit 4013. The switch unit 4013 is electrically connected to the three-phase motor 201. The control unit 4011 is configured to provide a pre-driving signal to the pre-driving unit 4012 according to the second startup pulse width modulation signal or the operating pulse width modulation signal, and the timing control signal. The pre-driving unit 4012 is configured to amplify the pre-driving signal and output the amplified pre-driving signal to the switch unit 4013. The switch unit 4013 is configured to provide the drive current to the three-phase motor 201 according to the amplified pre-driving signal.

In some embodiments, referring to FIG. 9, the pre-driving signal provided by the control unit 4011 includes: a first sub-driving signal PWM1, a second sub-driving signal PWM2, a third sub-driving signal PWM3, a fourth sub-driving signal PWM4, a fifth sub-driving signal PWM5, and a sixth sub-driving signal PWM6.

In some embodiments, as shown in FIG. 9, the pre-driving unit 4012 includes: a first driver D1, a second driver D2, and a third driver D3. The switch unit 4013 includes: a first transistor Q1, a second transistor Q2, a third transistor Q3, a fourth transistor Q4, a fifth transistor Q5, and a sixth transistor Q6.

The first driver D1 is connected to the control unit 4011, a gate of the first transistor Q1, and a gate of the second transistor Q2. A first electrode of the first transistor Q1 is connected to the first power supply terminal VCC, and a second electrode of the first transistor Q1 is connected to a first winding U of the three-phase motor 201. A first electrode of the transistor Q2 is connected to a second power supply terminal GND, and a second electrode of the second transistor Q2 is connected to the first winding U of the three-phase motor 201.

The first driver D1 is configured to amplify the first sub-driving signal PWM1 and output the amplified first sub-driving signal to the gate of the first transistor Q1, and amplify the second sub-driving signal PWM2 and output the amplified second sub-driving signal to the gate of the second transistor Q2.

The second driver D2 is connected to the control unit 4011, a gate of the third transistor Q3, and a gate of the fourth transistor Q4. A first electrode of the third transistor Q3 is connected to the first power supply terminal VCC, and a second electrode of the third transistor Q3 is connected to a second winding V of the three-phase motor 201. A first electrode of the fourth transistor Q4 is connected to the second power supply terminal GND, and a second electrode of the fourth transistor Q4 is connected to the second winding V of the three-phase motor 201.

The second driver D2 is configured to amplify the third sub-driving signal PWM3 and output the amplified third sub-driving signal to the gate of the third transistor Q3, and amplify the fourth sub-driving signal PWM4 and output the amplified fourth sub-driving signal to the gate of the fourth transistor Q4.

The third driver D3 is connected to the control unit 4011, a gate of the fifth transistor Q5, and a gate of the sixth transistor Q6. A first electrode of the fifth transistor Q5 is connected to the first power supply terminal VCC, and a second electrode of the fifth transistor Q5 is connected to a third winding W of the three-phase motor 201. A first electrode of the sixth transistor Q6 is connected to the second power supply terminal GND, and a second electrode of the sixth transistor Q6 is connected to the third winding W of the three-phase motor 201.

The third driver D3 is configured to amplify the fifth sub-driving signal PWM5 and output the amplified fifth sub-driving signal to the gate of the fifth transistor Q5, and amplify the sixth sub-driving signal PWM6 and output the amplified sixth sub-driving signal to the gate of the sixth transistor Q6.

In some embodiments, as shown in FIG. 9, each driver may be connected to the first power supply terminal VCC and a third power supply terminal. When each driver provides a connected transistor with a sub-driving signal to drive the transistor to turn on, the driver may be powered by the third power supply terminal. After the transistor is turned on, the driver may be powered by the first power supply terminal VCC.

In some examples, referring to FIG. 9, a capacitor is connected between each third power supply terminal and the first power supply terminal VCC. For example, a first capacitor C1 is connected between a third power supply terminal VCP1 and the first power supply terminal VCC, a second capacitor C2 is connected between a third power supply terminal VCP2 and the first power supply terminal VCC, and a third capacitor C3 is connected between a third power supply terminal VCP3 and the first power supply terminal VCC.

In this case, each capacitor may constitute a bootstrap circuit, and the larger a capacitance of the capacitor, the greater charging energy when the first power supply terminal VCC charges the third power supply terminal, and the higher a voltage of the third power supply terminal. The smaller the capacitance of the capacitor, the smaller the charging energy when the first power supply terminal VCC charges the third power supply terminal, and the lower the voltage of the third power supply terminal.

In the embodiments of the present disclosure, a capacitor with an applicable capacitance may be selected according to the specifications of the transistor. In this way, it is possible to avoid a problem of transistor burnout caused by the voltage of the third power supply terminal exceeding the specifications, and to avoid a problem that the transistor cannot be turned on normally due to the low voltage of the third power supply terminal, and this problem causes the transistor to be always in an off state, and unable to output the drive current to the three-phase motor 201.

In some embodiments, referring to FIG. 9, in addition to the pulse width modulation signal PWM0 (e.g., the first startup pulse width modulation signal PWM01, the second startup pulse width modulation signal PWM02, the operating pulse width modulation signal PWM03, or the deceleration pulse width modulation signal PWM04), signals provided by the main control circuit 30 to the diffusion wheel driving circuit 40 further include a direction control signal FR, a current control signal CS, an acceleration control signal RMP, and a conduction angle control signal ADV.

The control unit 4011 is configured to determine a rotation direction parameter of the three-phase motor 201 in the diffusion wheel 20 according to the direction control signal FR. The three-phase motor 201 in the diffusion wheel 20 rotates in a rotation direction indicated by the rotation direction parameter according to the rotation direction parameter. For example, when the direction control signal FR is 0, the three-phase motor 201 rotates in a forward direction. In this case, the rotation directions of the three windings in the three-phase motor 201 may be that: U rotates to V, V rotates to W, i.e., U→V→W. When the direction control signal FR is 1, the three-phase motor 201 may be controlled to rotate in a reverse direction. In this case, the rotation directions of the three windings in the three-phase motor 201 may be that: U rotates to W, and W rotates to V, i.e., U→W→V.

The control unit 4011 is configured to determine the starting current for driving the three-phase motor 201 to rotate according to the current control signal CS. The starting current may refer to a minimum drive current required for the three-phase motor 201 to start rotating from a standstill.

The control unit 4011 is configured to determine acceleration of the rotation of the three-phase motor 201 according to the acceleration control signal RMP. The acceleration determines the time required for the three-phase motor 201 from the start of rotation until a rotation speed stabilizes to the target rotation speed.

The control unit 4011 is configured to determine a conduction angle of the rotation of the three-phase motor 201 according to the conduction angle control signal ADV. The conduction angle may adjust a driving efficiency of driving the three-phase motor 201. By designing an appropriate conduction angle, it is possible to drive the three-phase motor 201 to rotate at the target rotation speed with the minimum torque (i.e., the drive current).

In some embodiments, the main control circuit 30 may be configured to adjust the duty cycle of the pulse width modulation signal PWM0 (e.g., the pulse width modulation signal PWM03) when determining that the difference between the rotation speed of the three-phase motor 201 and the target rotation speed is greater than the difference threshold, thereby realizing the adjustment to the rotation speed of the three-phase motor 201.

In some embodiments, as shown in FIG. 9, the control unit 4011 may include a timing control unit and an MCU logic control unit. The timing control unit may be configured to shape the timing control signal provided by a logic gate 4022. The MCU logic control unit may be configured to determine parameters including the rotation speed, the rotation direction, the starting current, a starting acceleration, and the driving efficiency of the three-phase motor 201, according to the pulse width modulation signal PWM0, the direction control signal FR, the current control signal CS, the acceleration control signal RMP, and the conduction angle control signal ADV provided by the main control circuit 30. The timing control unit and the MCU logic control unit may cooperate with each other to generate the pre-driving signal.

In some examples, referring to FIG. 9, the timing control sub-circuit 402 includes a comparison unit 4021 and the logic gate 4022. For example, the logic gate 4022 is an OR gate.

The comparison unit 4021 is connected to the three-phase motor 201 and the logic gate 4022. The comparison unit 4021 is configured to compare the voltage of the common terminal of the three-phase motor 201 with each of the three-phase output voltages, and output a comparison result to the logic gate 4022.

The logic gate 4022 is connected to the main control circuit 30 and the driving sub-circuit 401. For example, the logic gate 4022 may be connected to the control unit 4011 in the driving sub-circuit 401. The logic gate 4022 is configured to generate the timing control signal and the frequency signal FG for indicating the rotation speed of the three-phase motor 201 according to the comparison result, transmit the timing control signal to the driving sub-circuit 401, and transmit the frequency signal FG to the main control circuit 30.

For example, as shown in FIG. 9, a port for outputting the frequency signal FG in the logic gate 4022 is further connected to a resistor R0 and a transistor Q0, and the resistor R0 is connected to a fourth power supply terminal V3P3V. In this way, the resistor R0 and the transistor Q0 may ensure a driving capability and stability of the frequency signal FG output by the logic gate 4022.

In some embodiments, referring to FIG. 9, the comparison unit 4021 includes a first comparator CM1, a second comparator CM2, and a third comparator CM3. An input terminal (e.g., a negative input terminal) of each comparator is connected to the common terminal (e.g., a center tap) of the three-phase motor 201, and another input terminal (e.g., a positive input terminal) is connected to a winding of the three-phase motor 201. For example, another input terminal of the first comparator CM1 is connected to the first winding U of the three-phase motor 201, and the first comparator CM1 is configured to compare the common terminal voltage $u_N$ with a first phase output voltage $u_A$ of the first winding U. Another input terminal of the second comparator CM2 is connected to the second winding V of the three-phase motor 201, and the second comparator CM2 is configured to compare the common terminal voltage $u_N$ with a second phase output voltage $u_B$ of the second winding V. Another input terminal of the third comparator CM3 is connected to the third winding W of the three-phase motor 201, and the third comparator CM3 is configured to compare the common terminal voltage $u_N$ with a third phase output voltage $u_C$ of the third winding W.

Referring to FIG. 9, each comparator is further connected to the first power supply terminal VDD and the second power supply terminal GND, and the second power supply terminal GND may be grounded through an external resistor.

Table 1 is a drive timing table of the three-phase motor provided by some embodiments of the present disclosure. Table 1 shows transistors to be turned on corresponding to current directions of the windings in the three-phase motor 201 and comparison results output by the comparison unit 4021.

For example, it is assumed that the positive input terminal of each comparator is connected to the common terminal of the three-phase motor 201, and the negative input terminal thereof is connected to a winding of the three-phase motor 201. When the current direction of each winding is direction 1, i.e., from the first winding U to the second winding V, the second transistor Q2 and the third transistor Q3 in the switch unit 4013 are turned on. In this case, the first phase output voltage $u_A$ of the first winding U is relatively high, and the second phase output voltage $u_B$ of the second winding V is relatively low. An output result of the first comparator CM1 in the comparison unit 4021 is 0, an output result of the second comparator CM2 is 1, and an output result of the third comparator CM3 remains to be an output result in a previous phase (that is, the current direction of each winding is the direction 6), i.e., 0. In this case, the comparison result output by the comparison unit 4021 is 010.

When the current direction of each winding is direction 2, i.e., from the first winding U to the third winding V, the second transistor Q2 and the fifth transistor Q5 in the switch unit 4013 are turned on. In this case, the first phase output voltage $u_A$ of the first winding U is relatively high, and the third phase output voltage $u_C$ of the third winding W is relatively low. The output result of the first comparator CM1 in the comparison unit 4021 is 0, the output result of the third comparator CM3 is 1, and the output result of the second comparator CM2 remains to be the output result in a previous phase (that is, the current direction of each winding is the direction 1), i.e., 1. In this case, the comparison result output by the comparison unit 4021 is 011.

TABLE 1

| Current direction of the winding | Turned-on transistor | Comparison result | Sequence of direction changing |
|---|---|---|---|
| Direction 1  U → V | Q2 and Q3 | 010 | ↑ or ↓ |
| Direction 2  U → W | Q2 and Q5 | 011 | |
| Direction 3  V → W | Q4 and Q5 | 001 | |
| Direction 4  V → U | Q4 and Q1 | 101 | |
| Direction 5  W → U | Q6 and Q1 | 100 | |
| Direction 6  W → V | Q6 and Q3 | 110 | |

The three-phase motor 201 rotates a rotation of 360 degrees. It can be seen from Table 1 that in each rotation period of the three-phase motor 201, a current direction of each winding will change six times, that is, the current direction changes once every 60 degrees of rotation. Accordingly, the logic gate 4022 may output a pulse every time the current direction of each winding changes. Therefore, the logic gate 4022 may output six pulses in each rotation period of the three-phase motor 201. That is, a period of the frequency signal FG generated by the logic gate 4022 may be one sixth of the rotation period of the three-phase motor 201, and a frequency of the frequency signal FG may be six times the rotation speed of the three-phase motor 201 (i.e., the rotation speed of the diffusion wheel 20). As a result, the main control circuit 30 may determine the rotation speed of the three-phase motor 201 according to the frequency of the frequency signal FG.

It will be noted that, in some embodiments, changing sequences of the current directions of the windings in the three-phase motor 201 are from direction 1 to direction 6, that is, the rotation direction of each winding is U→V→W. In this case, the diffusion wheel 20 may be controlled to rotate in a forward direction. Alternatively, the changing sequences of the current directions of the windings in the three-phase motor 201 may also be from direction 6 to direction 1, that is, the rotation direction of each winding may be U→W→V. In this case, the diffusion wheel 20 may be controlled to rotate in a reverse direction. The changing sequences of the current directions of the windings in the three-phase motor 201 may be controlled by the direction control signal FR.

In some embodiments, the diffusion wheel driving circuit 40 may be an integrated circuit, that is, the diffusion wheel driving circuit 40 may be integrated in a chip. In this case, the chip may be referred to as a motor driver chip.

Figure 10:
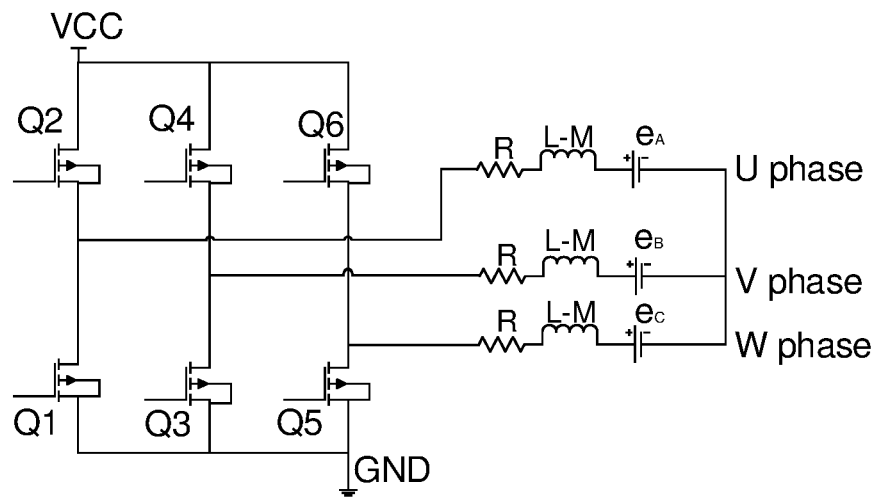
FIG. 10 is a circuit diagram of a switch unit, in accordance with some embodiments.

In some embodiments, in order to improve the driving efficiency, there is a need to select the best time of direction changing. FIG. 10 is an equivalent circuit diagram of the switch unit, in accordance with some embodiments of the present disclosure. As shown in FIG. 10, after the switch unit 4013 provides the drive current to the three-phase motor 201, the three-phase output voltages $u_A$, $u_B$, and $u_C$ of the three-phase motor 201 meet:

$$u_A = R \times i_A + (L - M)\frac{di_A}{dt} + e_A + u_N;$$

$$u_B = R \times i_B + (L - M)\frac{di_B}{dt} + e_B + u_N; \text{ and}$$

$$u_C = R \times i_C + (L - M)\frac{di_C}{dt} + e_C + u_N.$$

$i_A$, $i_B$, and $i_C$ are phase currents, $e_A$, $e_B$, and $e_C$ are back electromotive forces (BEMFs), and $u_N$ is a voltage to power ground of the common terminal of the three-phase motor 201. R, L and M are phase resistance, phase self-inductance, and phase mutual inductance, respectively. When the phase currents ($i_A$, $i_B$, and $i_C$) used to drive the three-phase motor 201 satisfy that $i_A+i_B+i_C=0$, the efficiency of driving the three-phase motor 201 is high. In this case, using a small torque (drive current) may cause the three-phase motor 201 to reach the target rotation speed.

Figure 11:
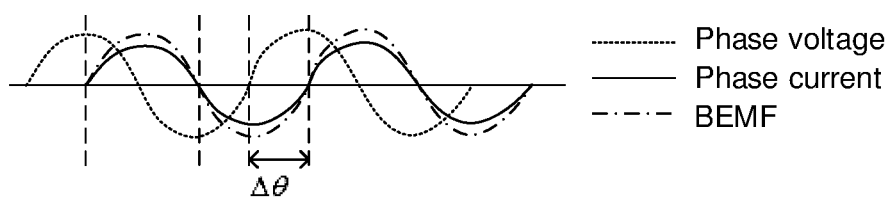
FIG. 11 is a timing diagram of a phase voltage, a phase current, and a back electromotive force, in accordance with some embodiments.

FIG. 11 is a timing diagram of a phase voltage, a phase current, and a back electromotive force, in accordance with some embodiments of the present disclosure. As shown in FIG. 11, the BEMF of the three-phase motor 201 is a sine wave, that is, the embodiments of the present disclosure adopts a sine wave drive manner. In this way, it is beneficial to improve the driving efficiency and reduce the noise of the motor 201 during startup and operation.

In addition, as shown in FIG. 11, the phase current and the BEMF are in phase, the phase voltage precedes the phase current, and a preceded phase angle is Δθ. When there is a phase difference between the phase voltage and the phase current, for example, when there is a delay in the phase angle of Δθ as shown in FIG. 11, $i_A+i_B+i_C>0$. In this case, the drive current required to drive the three-phase motor 201 to rotate at the target rotation speed may increase. As the drive current increases, the noise generated by the three-phase motor 201 also increases, thereby reducing reliability of the operation of the three-phase motor 201.

In this regard, in some embodiments, when the laser projection apparatus is designed, the resistance of the external resistor of the motor drive chip may be adjusted to different resistances. For each resistance, the drive current required for the motor drive chip to drive the three-phase motor 201 to reach the target rotation speed (e.g., 7200 r/min or 3600 r/min) under the resistance of the external resistor may be detected (e.g., the drive current may be detected by a galvanometer, and the rotation speed may be detected by an oscilloscope). After that, the drive currents corresponding to the resistances may be compared, and a resistance corresponding to the minimum drive current required to reach the target rotation speed is determined as the resistance of the external resistor of the motor drive chip. In this case, it may be ensured that $i_A+i_B+i_C=0$, so that the driving efficiency of the three-phase motor 201 is high, the noise is low, and the reliability is high.

Figure 12:
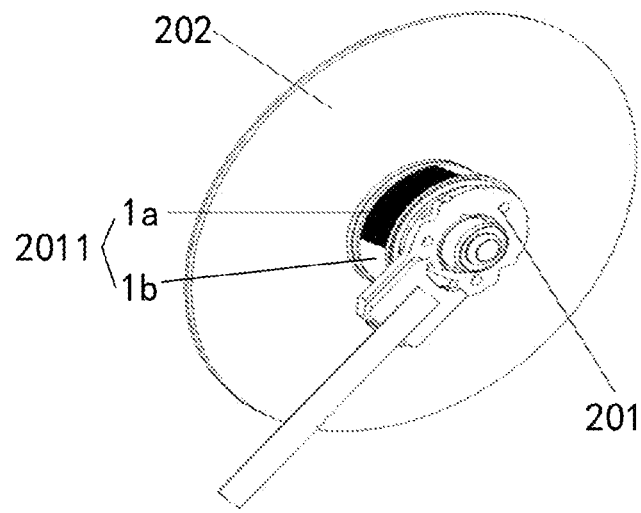
FIG. 12 is a structural diagram of a diffusion wheel, in accordance with some embodiments.

FIG. 12 is a schematic diagram showing a structure of the diffusion wheel, in accordance with some embodiments of the present disclosure. As shown in FIG. 12, a side wall of a rotating shaft 2011 of the motor 201 in the diffusion wheel 20 may include two regions, i.e., a first region 1a and a second region 1b, arranged along a circumference of the rotating shaft 2011. A reflectivity of the first region 1a differs from a reflectivity of the second region 1b.

Figure 13:
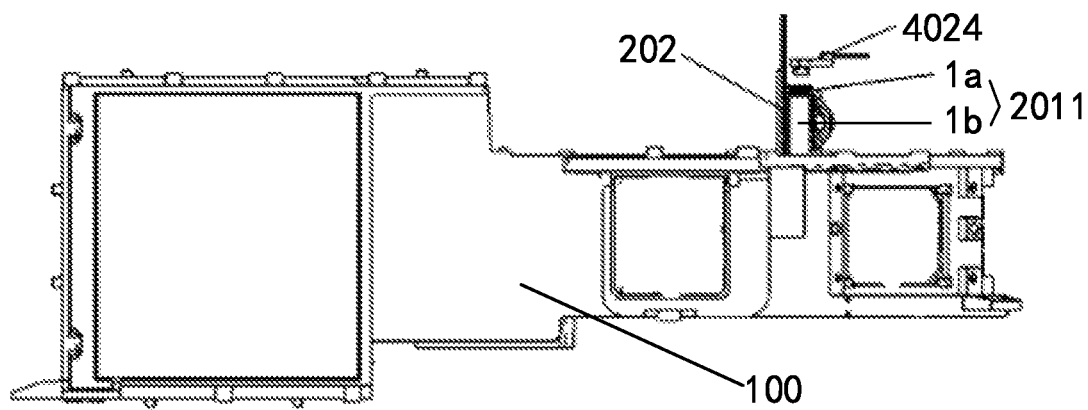
FIG. 13 is a partial structural diagram of a laser projection apparatus, in accordance with some embodiments.
Figure 14:
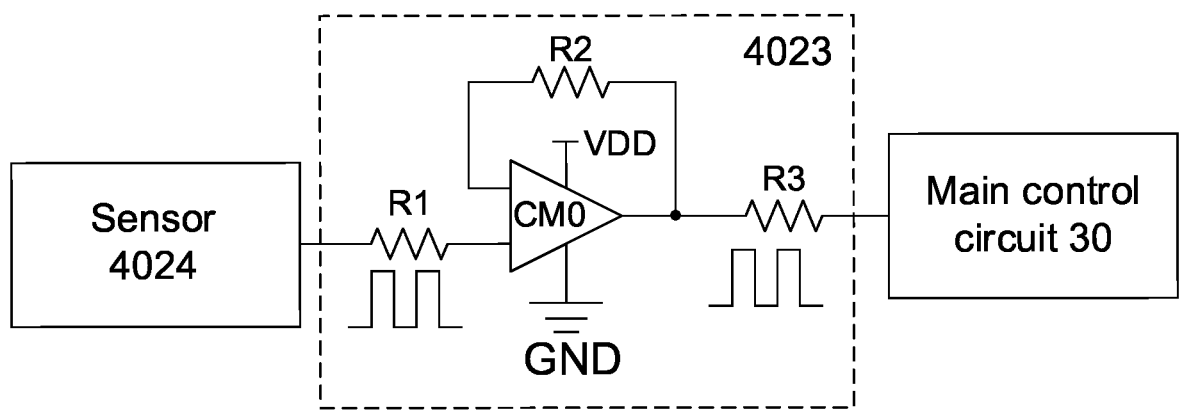
FIG. 14 is a schematic diagram of a detection unit, in accordance with some embodiments.

Referring to FIGS. 9, 13, and 14, the timing control sub-circuit 402 may include: the comparison unit 4021, the logic gate 4022, a detection unit 4023, and a sensor 4024 arranged opposite to the rotating shaft 2011.

The comparison unit 4021 is connected to the three-phase motor 201 and the logic gate 4022. The comparison unit 4021 is configured to compare the common terminal voltage of the three-phase motor 201 with the output voltage of each phase of the three-phase output voltages, and output the comparison result to the logic gate 4022.

The logic gate 4022 is connected to the driving sub-circuit 401. The logic gate 4022 is configured to generate the timing control signal according to the comparison result, and transmit the timing control signal to the driving sub-circuit 401.

The sensor 4024 is connected to the detection unit 4023. The sensor 4024 is configured to transmit a detection signal, receive a reflection signal reflected by the side wall of the rotating shaft 2011, detect an intensity of the reflection signal, and transmit the intensity of the reflection signal to the detection unit 4023. For example, the sensor 4024 converts a reflection signal with a certain intensity into an electrical signal with a certain amplitude, and transmits the electrical signal to the detection unit 4023.

The detection unit 4023 is connected to the main control circuit 30. The detection unit 4023 is configured to generate a frequency signal according to a change frequency of intensities of reflection signals, and transmit the frequency signal to the main control circuit 30.

Since reflectivities of the two regions (i.e., the first region 1a and the second region 1b) of the rotating shaft 2011 of the three-phase motor 201 are different, intensities of the reflection signals received by the sensor 4024 are different during a rotation of the three-phase motor 201. The detection unit 4023 may generate the frequency signal for indicating the rotation speed of the three-phase motor 201, according to the change frequency of the intensities of the reflection signals.

In this case, in addition to a case that the logic gate 4022 generates the frequency signal for indicating the rotation speed of the three-phase motor 201, the frequency signal may also be generated by the sensor 4024 and the detection unit 4023.

When the three-phase motor 201 is locked, the three-phase output voltages thereof may increase, phase currents thereof may increase, and the frequency of the frequency signal FG generated by the logic gate 4022 may also increase. In this case, the frequency signal FG generated by the logic gate 4022 may not accurately reflect an actual rotation speed of the three-phase motor 201, so that the diffusion wheel 20 cannot effectively eliminate the speckles. In addition, the three-phase motor 201 may be burned out due to a long-time locked-rotor of the three-phase motor 201. In this regard, in the embodiments of the present disclosure, the rotating shaft of the three-phase motor 201 is designed to have two regions with different reflectivity, and the frequency signal is generated by the sensor 4024 and the detection unit 4023, so that the actual rotation speed of the diffusion wheel 20 may be accurately detected, and a case of locked-rotor may be found in time.

In some examples, the sensor 4024 may output a detection current to the detection unit 4023. The stronger the intensity of the reflection signal detected by the sensor 4024, the greater the detection current the sensor 4024 outputs. The detection current IC may be expressed by the following formula: $IC=B\times f(IF)\times F(d)$, where B is a reflectivity of the side wall of the rotating shaft 2011, f(IF) is a function of an output current and an input current of the sensor 4024, F(d) is an efficiency function of the sensor 4024, and d is a minimum distance between the sensor 4024 and the side wall of the rotating shaft 2011.

In some examples, of the two regions, a reflectivity B1 of the first region 1a is less than a reflectivity B2 of the second region 1b. Based on the above formula, it can be seen that when the detection signal transmitted by the sensor 4024 irradiates to the first region 1a, a detection current IC1 output by the sensor 4024 to the detection unit 4023 is of a relatively small value; and when the detection signal transmitted by the sensor 4024 irradiates to the second region 1b, a detection current IC2 output by the sensor 4024 to the detection unit 4023 is of a relatively large value. The detection unit 4023 may generate a frequency signal with a level changing constantly, according to a frequency of change of a magnitude of the detection current IC.

For example, the sensor 4024 may be an infrared sensor, and the detection signal may be infrared light. A black tape may be attached to one of the two regions (e.g., the first region 1a), and the black tape can absorb the infrared light, thereby reducing the intensity of the reflection signal.

In some examples, referring to FIG. 13, other devices in the laser projection apparatus except the diffusion wheel 20 are contained in a portion 100 below the diffusion wheel 20. For example, these devices include the laser light source 10, the main control circuit 30, the diffusion wheel driving circuit 40, a light valve, and a projection lens.

FIG. 14 is a schematic diagram of the detection unit, in accordance with some embodiments of the present disclosure. As shown in FIG. 14, the detection unit 4023 may include a first resistor R1, a second resistor R2, a third resistor R3, and a comparator CM0.

An end of the first resistor R1 is connected to the sensor 4024, and another end thereof is connected to a first input terminal of the comparator CM0. A second input terminal of the comparator CM0 is connected to an end of the second resistor R2, and an output terminal of the comparator CM0 is connected to another end of the second resistor R2 and an end of the third resistor R3; and another end of the third resistor R3 is connected to the main control circuit 30.

In this case, the detection unit 4023 may convert a relatively large value and a relatively small value of the detection current IC into a high-level signal and a low-level signal of a digital pulse signal (i.e., a frequency signal), respectively. A cycle that the three-phase motor 201 rotates corresponds to a period of the digital pulse signal, so a frequency of the digital pulse signal may reflect the rotation speed of the three-phase motor 201. When the three-phase motor 201 is in a locked-rotor state, a waveform of the digital pulse signal is at a steady-state level (e.g., when the sensor 4024 detects the first region 1a of the rotating shaft 2011, the digital pulse signal is at a low level, e.g., a voltage of the digital pulse signal is 0 V, and when the sensor 4024 detects the second region 1b of the rotating shaft 2011, the digital pulse signal is at a high level, e.g., the voltage of the digital pulse signal is 3.3 V), that is, the frequency is 0. In this way, the main control circuit 30 may accurately determine whether the three-phase motor 201 is in the locked-rotor state according to the frequency of the digital pulse signal.

When detecting the reflection signal, the sensor 4024 may be affected by stray light in the environment where the sensor 4024 located. Therefore, the low level of the frequency signal output by the detection unit 4023 to be not low enough (e.g., greater than 0.8 V), and the high level thereof is not high enough (e.g., less than 2.5 V). In this way, it may cause misjudgment by the subsequent main control circuit 30.

In the embodiments of the present disclosure, the detection unit 4023 adopts a hysteresis comparison circuit as shown in FIG. 14, which may ensure that the low level of the frequency signal output by the detection unit 4023 is 0 V, and the high level thereof is 3.3 V, thereby avoiding the misjudgment of the main control circuit 30. In addition, the detection unit 4023 has a delay effect, which may filter out the unstable detection current output by the sensor 4024 when the three-phase motor 201 just rotates and the rotation speed is unstable.

In some embodiments, the main control circuit 30 is further configured to determine whether the rotation speed of the three-phase motor 201 is less than a rotation speed threshold according to the frequency signal, and if the rotation speed of the three-phase motor 201 is less than the rotation speed threshold, the three-phase motor 201 is restarted. If the three-phase motor 201 is still in the locked-rotor state after the three-phase motor 201 has been restarted many times, the main control circuit 30 may turn off the three-phase motor 201.

Figure 15:
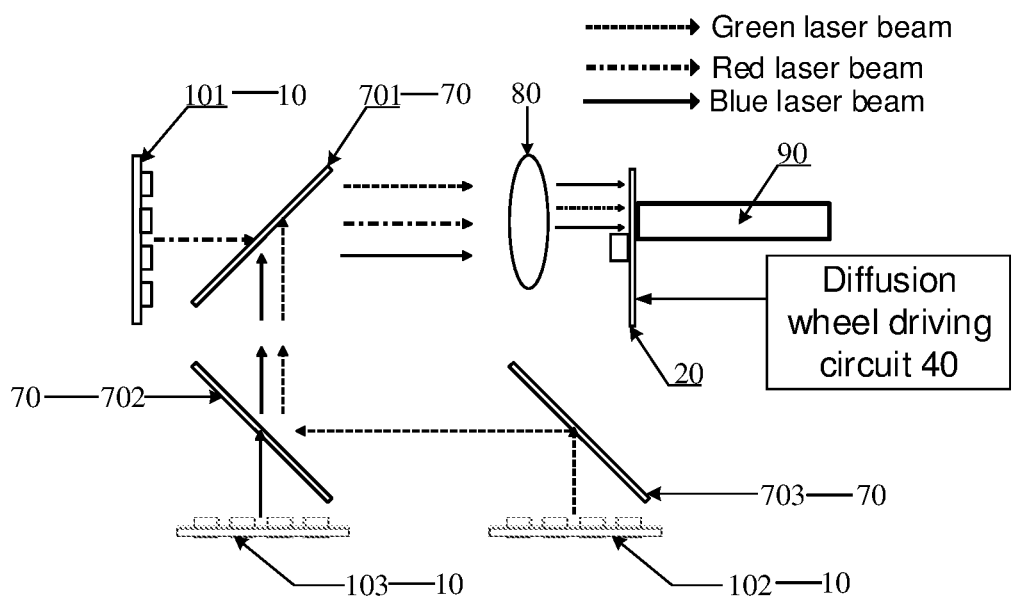
FIG. 15 is a schematic diagram of a laser light source, in accordance with some embodiments.

In some examples, referring to FIG. 15, the laser light source 10 may include three lasers of different colors. For example, referring to FIG. 15, the three lasers may include a red laser 101 for emitting red laser beam, a green laser 102 for emitting green laser beam, and a blue laser 103 for emitting blue laser beam. For example, each laser is a multichiped laser (MCL).

Figure 16:
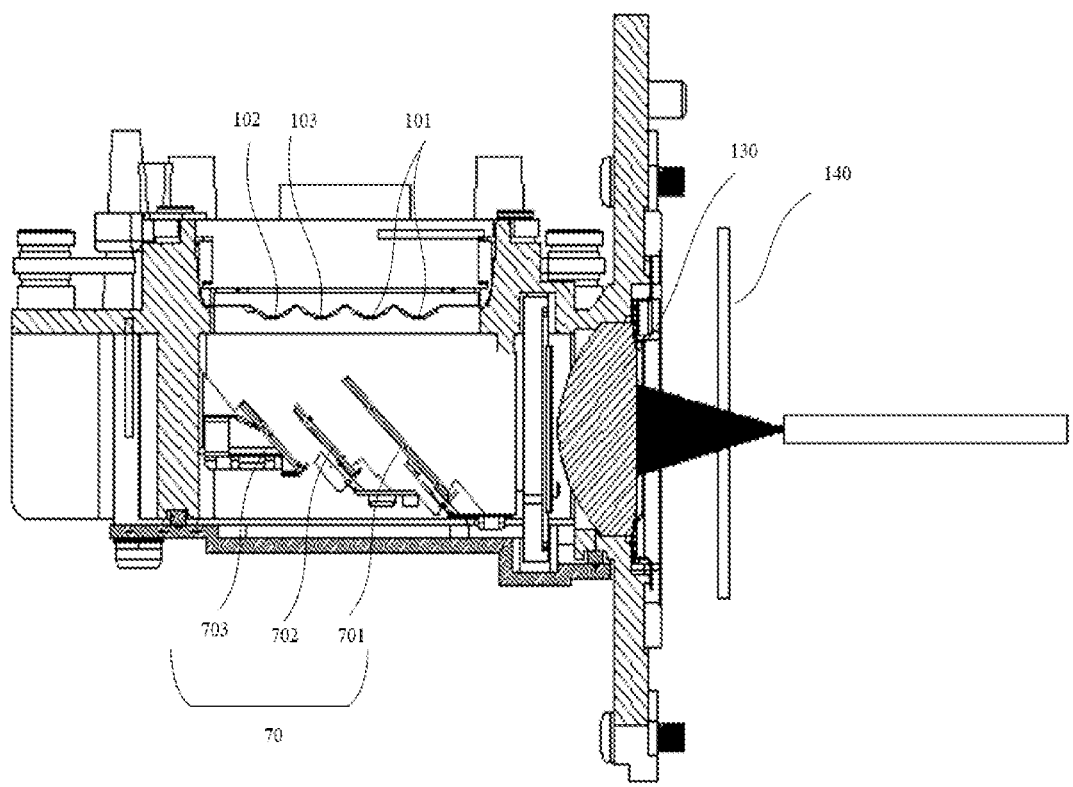
FIG. 16 is a schematic diagram of another laser light source, in accordance with some embodiments.

In some other examples, referring to FIG. 16, the laser light source 10 may include three light-emitting chips that emit laser beams of three colors. That is, the laser light source 10 may be a laser assembly packaged with three light-emitting chips. For example, the three light-emitting chips in the laser light source 10 may include a light-emitting chip 101 for emitting red laser beam, a light-emitting chip 102 for emitting green laser beam, and a light-emitting chip 103 for emitting blue laser beam. In addition, referring to FIG. 16, the laser assembly 10 may be provided with two light-emitting chips 101 for emitting red laser beam.

In some embodiments, as shown in FIG. 15, the laser projection apparatus further includes a light combining mirror group 70 configured to combine the laser beams of three colors, and an optical path shaping lens 80 for shaping an optical path of the combined laser beam.

In some examples, the light combining mirror group 70 includes a first dichroic mirror 701, a second dichroic mirror 702, and a mirror 703. The optical path shaping lens 80 may be an optical lens including a collimating lens.

For example, the laser light source 10 includes the three lasers of different colors. As shown in FIG. 15, the red laser beam emitted by the red laser 101 may be transmitted to the optical path shaping lens 80 through the first dichroic mirror 701. The green laser beam emitted by the green laser 102 may be first reflected by the mirror 703 to the second dichroic mirror 702, then reflected by the second dichroic mirror 702 to the first dichroic mirror 701, and then reflected by the first dichroic mirror 701 to the optical path shaping lens 80. The blue laser beam emitted by the blue laser 103 may be transmitted by the second dichroic mirror 702 to the first dichroic mirror 701, and then reflected by the first dichroic mirror 701 to the optical path shaping lens 80. The optical path shaping lens 80 collimates the laser beams of three colors and transmits the collimated laser beams of three colors to the diffusion wheel 20, and the diffusion wheel 20 homogenizes the laser beams and transmits the homogenized laser beams to a light collecting device 90. The light collecting device 90 may be a light rod or light pipe, which also has light homogenizing effect.

For example, as shown in FIG. 16, the laser light source 10 includes the three light-emitting chips, and the red laser beam emitted by the red light-emitting chip 101 may be reflected by the first dichroic mirror 701 to a converging lens 130. The green laser beam emitted by the green light-emitting chip 102 may first be reflected by the mirror 703 to the second dichroic mirror 702, and then transmitted by the second dichroic mirror 702 to the first dichroic mirror 701, and then transmitted by the first dichroic mirror 701 to the optical path shaping lens 80. The blue laser beam emitted by the blue light-emitting chip 103 may be reflected by the second dichroic mirror 702 to the first dichroic mirror 701, then combined and transmitted by the first dichroic mirror 701 to the converging lens 130, and incident on the diffusion wheel 140.

In some embodiments, the laser projection apparatus further includes the light valve and the projection lens. The light valve is configured to modulate light of each color into an image light beam and transmit the image light beam to the projection lens. The projection lens is configured to project the image light beam onto the projection screen. In this way, the laser projection apparatus may realize image display.

Figure 17:
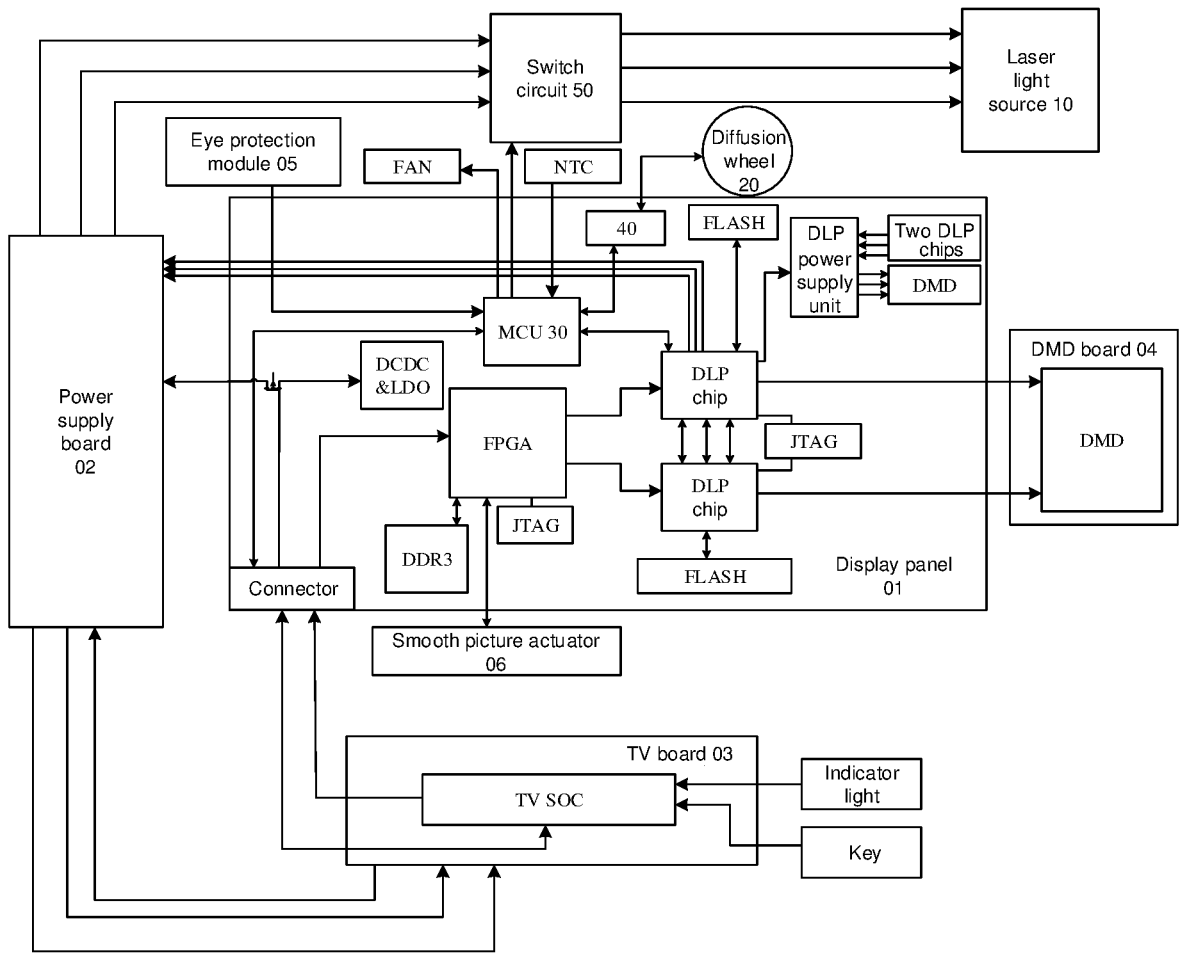
FIG. 17 is a partial block diagram of another laser projection apparatus, in accordance with some embodiments.

FIG. 17 is a partial structural diagram of the laser projection apparatus, in accordance with some embodiments of the present disclosure. As shown in FIG. 17, the laser projection apparatus may further include: a display panel 01, a power supply board 02, a television (TV) board 03, a digital micromirror device (DMD) board 04, an eye protection module 05, and a smooth picture actuator 06.

In some examples, the main control circuit 30 and the diffusion wheel driving circuit 40 are disposed on the display panel 01. Referring to FIG. 17, the main control circuit 30 may be a microcontroller unit (MCU), and may also be referred to as a single-chip microcomputer. The display panel 01 is also provided with a field programmable gate array (FPGA), two digital light processing (DLP) chips, a DLP power supply unit, a direct current (DC)/DC converter, a low dropout regulator (LDO), and other devices. The DC/DC converter and the LDO may be integrated. The FPGA may be connected to a double data rate 3 (DDR3) synchronous dynamic random access memory and a joint test action group (JTAG) interface. Each DLP chip is connected to a flash memory (FLASH), and the two DLP chips are connected through a data interface such as an inter-integrated circuit (I2C). The FPGA may be connected to four DDR3s, and a storage capacity of each DDR3 may be 2 gigabits (Gbs). A storage capacity of each FLASH may be 128 megabits (Mbs).

In some examples, referring to FIG. 17, the laser projection apparatus further includes a fan (FAN). For example, the laser projection apparatus includes multiple fans, such as five fans. The temperature sensor 60 in the laser projection apparatus may be a negative temperature coefficient (NTC)

thermistor. For example, the laser projection apparatus is provided with two NTC thermistors, one of the two NTC thermistors is configured to detect the ambient temperature, and another of the two NTC thermistors may be configured to detect the temperature of the laser light source 10. The MCU 30 may also be connected to the eye protection module 05, the fan, and the NTC thermistors. The MCU 30 may control a speed of the fan according to temperatures detected by the NTC thermistors.

The power supply board 02 is connected to the display panel 01, the TV board 03, and the switch circuit 50, and is configured to supply power to the connected devices.

In some examples, a laser drive circuit may be disposed on the power supply board 02; or, the laser drive circuit may also be disposed independently of the power supply board 02.

The TV board 03 is provided with a system on chip (SOC), and the SOC is configured to decode data of different data formats into a normalized format, and transmit the data of the normalized format to the MCU 30 through a connector on the display panel 01. Referring to FIG. 17, the SOC may also be connected to an indicator light and a key. The indicator light may be configured to indicate states such as standby state, startup state, and error state.

The DMD board 04 is provided with a DMD, and the DMD may be connected to each DLP chip and the DLP power supply unit disposed on the display panel 01. The DLP power supply unit may be configured to supply power to the DLP chip and the DMD.

The switch circuit 50 is connected to the power supply board 02, the MCU 30, and the laser light source 10. The switch circuit 50 may be configured to conduct the power supply board 02 and the laser light source 10 under the control of the MCU 30, so that the power supply board 02 supplies power to the laser light source 10, and that the laser drive circuit disposed on the power supply board 02 may provide a laser drive signal to the laser light source 10. The laser drive signal may be generated by the DLP chip and provided for the laser drive circuit.

For example, the laser light source 10 includes a red laser, a green laser, and a blue laser, the power supply board 02 may provide a drive current of 2.9 A for the red laser, a drive current of 2 A for the green laser, and a drive current of 3 A for the blue laser.

In some embodiments, the main control circuit 30 is further configured to first detect whether the DLP circuit, the temperature sensor 60, the diffusion wheel driving circuit 40, and the fan in the laser projection apparatus are started normally in response to the startup instruction after detecting the startup instruction. If it is determined that the above-mentioned components are all started normally and the rotation speed of the motor 201 reaches the target rotation speed, the main control circuit 30 provides the first switch signal to the switch circuit 50. If it is detected that at least one component of the DLP circuit, the temperature sensor 60, and the fan is started abnormally, the main control circuit 30 may control the abnormally started component to restart. Since the diffusion wheel driving circuit 40 has an automatic restart function, there is no need for the main control circuit 30 to control the diffusion wheel driving circuit 40 to restart.

Figure 18:
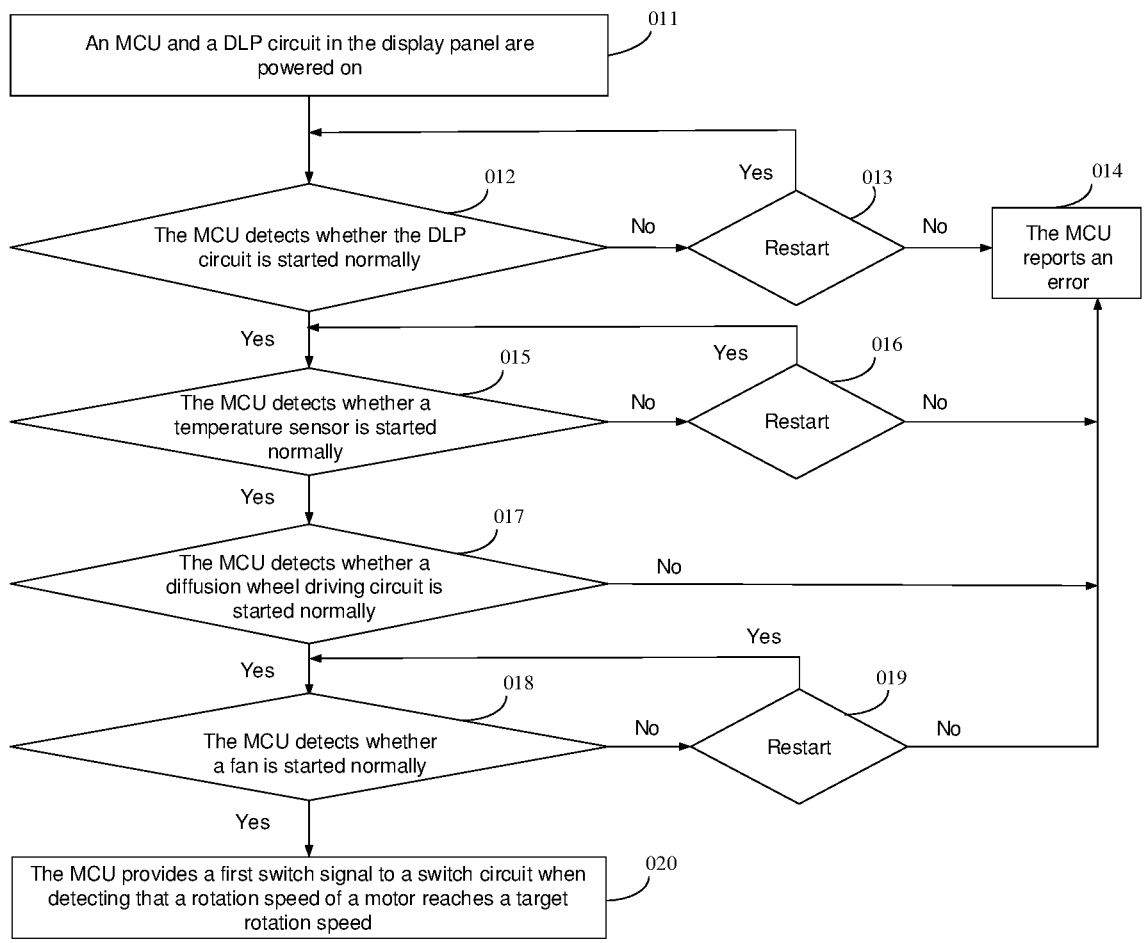
FIG. 18 is a flow diagram of yet another control method of a laser projection apparatus, in accordance with some embodiments.

FIG. 18 shows a flow diagram of yet another control method of the laser projection apparatus, in accordance with some embodiments. As shown in FIG. 18, the control method includes steps 011 to 020.

In step 011, the MCU and the DLP circuit in the display panel are powered on.

The DLP circuit may include DLP chips, the FPGA, FLASHs, and the DMD board.

In step 012, the MCU detects whether the DLP circuit is started normally.

If the DLP circuit is started normally, step 015 is performed, and if the DLP circuit is started abnormally, step 013 is performed.

In step 013, the MCU restarts the DLP circuit.

If the DLP circuit is restarted successfully, the MCU performs step 012 again. If the DLP circuit fails to be restarted, step 014 is performed.

In step 014, the MCU reports an error.

In some examples, the MCU may control a display screen to display an error prompt message. In some other examples, when the display screen is turned off, the MCU may control the indicator light to flash. In addition, the MCU may control the indicator light to flash in different ways in response to the restart failure of different devices.

In step 015, the MCU detects whether the temperature sensor is started normally.

If the temperature sensor (e.g., the NTC thermistor) is started normally, step 017 may be performed; and if the temperature sensor is started abnormally, step 016 may be performed.

In step 016, the MCU restarts the temperature sensor.

If the temperature sensor is restarted successfully, the MCU performs step 015 again; and if the temperature sensor fails to be restarted, the MCU performs step 014.

In step 017, the MCU detects whether the diffusion wheel driving circuit is started normally.

If the diffusion wheel driving circuit is started normally, step 018 may be performed; and if the diffusion wheel driving circuit is started abnormally, step 014 is performed.

In step 018, the MCU detects whether the fan is started normally.

If the fan is started normally, step 020 may be performed, and if the fan is started abnormally, step 019 may be performed.

In step 019, the MCU restarts the fan.

If the fan is restarted successfully, step 018 may be performed again, and if the fan fails to be restarted, step 014 is performed.

In step 020, the MCU provides the first switch signal to the switch circuit when detecting that the rotation speed of the motor reaches the target rotation speed.

In this case, the MCU may provide the first switch signal to the switch circuit when detecting that the DLP circuit, the temperature sensor, the diffusion wheel driving circuit, and the fan are all started normally, and the rotation speed of the motor reaches the target rotation speed. In this case, the switch circuit may provide the laser drive signal to the laser light source in response to the first switch signal, so as to drive the laser light source to emit laser beams, so that the laser projection apparatus is turned on.

It will be noted that an order of execution of the steps in which the MCU detects whether the devices are started normally may be adjusted according to situations. For example, step 018 may be performed before step 017, and step 017 may also be performed before step 015, which will not be limited by the embodiments of the present disclosure.

In summary, in the control method of the laser projection apparatus provided by the embodiments of the present disclosure, in the startup process, the main control circuit 30 first provides the first startup pulse width modulation signal with a relatively small duty cycle to the diffusion wheel driving circuit 40, and then provides the second startup width modulation signal with a relatively large duty cycle to the diffusion wheel driving circuit 40. The second startup pulse width modulation signal may ensure that the motor 201 of the diffusion wheel 20 starts normally. Since the diffusion wheel driving circuit 40 may softly start the motor 201 based on the first startup pulse width modulation signal with a small duty cycle in the startup process, a duration for the main control circuit 30 to provide the second startup pulse width modulation signal with a large duty cycle to the diffusion wheel driving circuit 40 is reduced, that is, a duration for the diffusion wheel driving circuit 40 to provide a large drive current the motor 201 is reduced. Further, while a startup efficiency is ensured, the noise of the motor 201 in the startup process is effectively reduced, that is, the laser projection apparatus may achieve a high startup efficiency and low startup noise.

Figure 19:
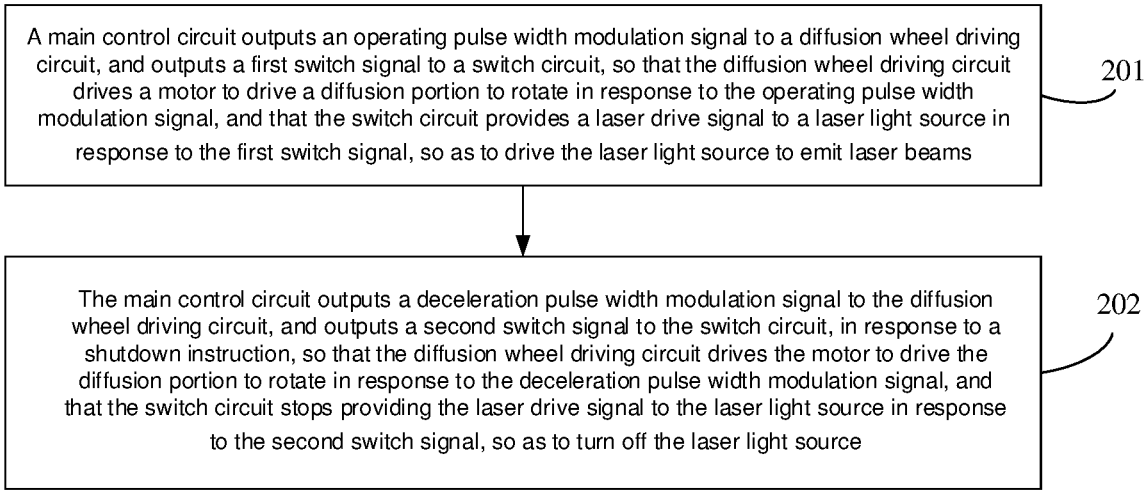
FIG. 19 is a flow diagram of yet another control method of a laser projection apparatus, in accordance with some embodiments.

FIG. 19 is a flow diagram of yet another control method of the laser projection apparatus, in accordance with some embodiments of the present disclosure. The control method is performed at the main control circuit 30 in the laser projection apparatus provided in the above-mentioned embodiments.

Referring to FIG. 19, the control method includes steps 201 and 202.

In step 201, the main control circuit outputs an operating pulse width modulation signal to the diffusion wheel driving circuit, and outputs a first switch signal to the switch circuit, so that the diffusion wheel driving circuit drives the motor to drive the diffusion portion to rotate in response to the operating pulse width modulation signal, and that the switch circuit provides a laser drive signal to the laser light source in response to the first switch signal, so as to drive the laser light source to emit laser beams.

In step 202, in response to a shutdown instruction, the main control circuit outputs a deceleration pulse width modulation signal to the diffusion wheel driving circuit, and outputs a second switch signal to the switch circuit, so that the diffusion wheel driving circuit drives the motor to drive the diffusion portion to rotate in response to the deceleration pulse width modulation signal, and that the switch circuit stops providing the laser drive signal to the laser light source in response to the second switch signal, so as to turn off the laser light source.

The duty cycle of the deceleration pulse width modulation signal is less than the duty cycle of the operating pulse width modulation signal.

For implementation processes of steps 201 and 202, reference may be made to the related description of steps 14 and 15 in the above method embodiments, which will not be repeated here.

In summary, in the control method of the laser projection apparatus provided by the embodiments of the present disclosure, the laser projection apparatus has a deceleration phase in a shutdown process, which makes the drive current provided by the diffusion wheel driving circuit for the motor reduced to a small value, and then slowly transition to zero in accordance with a sine wave. As a result, the rotation speed of the motor may be quickly reduced to a low rotation speed, and then freely coast from the low rotation speed to a stationary state. Therefore, the duration of the drive current of the operating phase during the shutdown process may be effectively reduced, thereby improving a shutdown efficiency of the laser projection apparatus, and reducing the noise of the motor in the shutdown process, that is, the laser projection apparatus may achieve a high shutdown efficiency and low shutdown noise.

Some embodiments of the present disclosure further provide a laser projection apparatus. Referring to introduction of FIGS. 1A and 1B, the laser projection apparatus is used to implement the control method provided by the foregoing embodiments. The laser projection apparatus achieves high startup and shutdown efficiency, and low startup and shutdown noise.

Some embodiments of the present disclosure provide a non-transitory computer-readable storage medium that stores one or more computer programs. When the one or more computer programs are executed by the main control circuit 30 of the laser projection apparatus, the main control circuit 30 implements the control method of the laser projection apparatus as described in any of the above embodiments. For example, the main control circuit 30 implements one or more steps in the control method.

For example, the computer-readable storage medium may include, but are not limited to: a magnetic storage device (e.g., a hard disk, a floppy disk, or a tape), an optical disk (e.g., a compact disk (CD), and a digital versatile disk (DVD)), a smart card and a flash memory device (e.g., an erasable programmable read-only memory (EPROM), a card, a stick or a key drive). Various non-computer-readable storage media described in the present disclosure may represent one or more devices or other machine-readable storage media for storing information.

Some embodiments of the present disclosure provide a computer program product. The computer program product includes one or more computer programs carried on a non-transitory computer-readable storage medium. When executed by the main control circuit 30 of the laser projection apparatus, the one or more computer programs enable the main control circuit 30 to implement the control method of the laser projection apparatus as described in the above embodiments, for example, to implement one or more steps in the control methods.

Beneficial effects of the foregoing non-transitory computer-readable storage medium and the computer program product are the same as the beneficial effects of the control method of the laser projection apparatus described in any of the above embodiments, which will not be described herein again.

The foregoing descriptions are merely exemplary embodiments of the present disclosure, and are not intended to limit the present disclosure. Any modification, equivalent replacement, improvement, etc. made within the spirit and principle of the present disclosure shall be included in the protection scope of the present disclosure.

What is claimed is:

1. A laser projection apparatus, comprising a laser light source, a light combining mirror group, an optical path shaping lens, a diffusion wheel, a light collecting device, a light valve, a projection lens, a main control circuit, a diffusion wheel driving circuit and a temperature sensor, wherein the laser light source is configured to emit laser beams of three colors;

the combining mirror group is configured to combine the laser beams of three colors;

the optical path shaping lens is configured to shape a light path of the combined laser beams; and the combined laser beams are transmitted to the optical path shaping lens and then incident to the diffusion wheel;

the diffusion wheel is configured to homogenize the laser beams and then transmit the laser beams to the light collecting device;

the light valve is configured to modulate light of each color into an image light beam and transmit the image light beam to the projection lens;

the projection lens is configured to project the image light beam onto a projection screen;

the diffusion wheel includes a motor and a diffusion portion, wherein the motor is a three-phase motor;

the temperature sensor is electrically connected to the main control circuit, and configured to detect an ambient temperature;

the main control circuit is configured to: determine a target starting current according to the ambient temperature; determine a duty cycle of a second startup pulse width modulation signal according to the target starting current, and provide the second startup pulse width modulation signal to the diffusion wheel driving circuit; and output an operating pulse width modulation signal to the diffusion wheel driving circuit when the diffusion wheel reaches a target rotation speed, wherein the target starting current is a minimum drive current required to drive the motor from standstill to starting to rotate, and the target rotation speed is a preset speed at which the diffusion wheel operates normally and speckles can be eliminated; and the diffusion wheel driving circuit is configured to drive the three-phase motor to drive the diffusion portion in response to each of the second startup pulse width modulation signal and the operating pulse width modulation signal.

2. The laser projection apparatus according to claim 1, wherein the target starting current is negatively correlated with the ambient temperature.

3. The laser projection apparatus according to claim 1, wherein the main control circuit is further configured to: obtain a frequency signal sent by the diffusion wheel driving circuit, and obtain a rotation speed of the three-phase motor according to the frequency signal; and an amplitude of a drive current, provided by the diffusion wheel driving circuit to the motor when the motor operates at the target rotation speed is less than an amplitude of the target starting current.

4. The laser projection apparatus according to claim 3, wherein the main control circuit is further configured to obtain a difference between the rotation speed of the three-phase motor and the target rotation speed at every certain period, and determine whether the operating pulse width modulation signal needs to be adjusted based on the difference.

5. The laser projection apparatus according to claim 1, wherein the diffusion wheel driving circuit includes a driving sub-circuit and a timing control sub-circuit;

the driving sub-circuit is configured to provide a drive current to the three-phase motor according to the second startup pulse width modulation signal provided by the main control circuit and a timing control signal provided by the timing control sub-circuit or according to the operating pulse width modulation signal provided by the main control circuit and the timing control signal; and the timing control sub-circuit is configured to obtain three-phase output voltages of the three-phase motor, generate the timing control signal and a frequency signal for indicating a rotation speed of the three-phase motor according to the three-phase output voltages, transmit the timing control signal to the drive sub-circuit, and transmit the frequency signal to the main control circuit.

6. The laser projection apparatus according to claim 5, wherein the driving sub-circuit includes a control unit, a pre-driving unit and a switch unit;

the control unit is electrically connected to the main control circuit, the timing control sub-circuit and the pre-driving unit; the pre-driving unit is further electrically connected to the switch unit; the switch unit is further electrically connected to the three-phase motor;

the control unit is configured to provide a pre-driving signal to the pre-driving unit according to the second startup pulse width modulation signal and the timing control signal or according to the operating pulse width modulation signal and the timing control signal;

the pre-driving unit is configured to amplify the pre-driving signal and output the amplified pre-driving signal to the switch unit; and the switch unit is configured to provide the drive current to the three-phase motor according to the amplified pre-driving signal.

7. The laser projection apparatus according to claim 6, wherein the main control circuit is further configured to provide a direction control signal, a current control signal, and an acceleration control signal to the diffusion wheel driving circuit; and the control unit is configured to determine a rotation direction parameter of the three-phase motor of the diffusion wheel according to the direction control signal, determine a starting current according to the current control signal for driving the three-phase motor to rotate, and determine an acceleration of a rotation of the three-phase motor according to the acceleration control signal.

8. The laser projection apparatus according to claim 6, wherein a back electromotive force of the three-phase motor a sine wave, and a phase current of the three-phase motor is in phase with the back electromotive force of the three-phase motor.

9. The laser projection apparatus according to claim 8, wherein the three-phase motor is a brushless direct current motor.

10. The laser projection apparatus according to claim 5, wherein the main control circuit is further configured to adjust a duty cycle of the operating pulse width modulation signal when determining that a difference between the rotation speed of the three-phase motor and the target rotation speed is greater than a difference threshold, thereby realizing an adjustment to a rotation speed of the diffusion wheel.

11. The laser projection apparatus according to claim 5, wherein a side wall of a rotating shaft of the three-phase motor includes a first region and a second region arranged along a circumference of the rotating shaft, a reflectivity of the first region differs from a reflectivity of the second region; and the timing control sub-circuit includes a detection unit and a sensor arranged opposite to the rotating shaft; the sensor is configured to transmit a detection signal, receive a reflection signal reflected by the side wall of the rotating shaft, detect an intensity of the reflection signal, and transmit the intensity of the reflection signal to the detection unit; and the detection unit is configured to generate the frequency signal according to a change frequency of intensities of reflection signals, and transmit the frequency signal to the main control circuit.

12. The laser projection apparatus according to claim 11, wherein the sensor is further configured to output a detection current to the detection unit, the detection current satisfies:

$$IC = B \times f(IF) \times F(d),$$

where IC is the detection current, B is a reflectivity of the sidewall of the rotating shaft, f(IF) is a function of an output current and an input current of the sensor, F(d) is an efficiency function of the sensor, and d is a minimum distance between the sensor and the side wall of the rotating shaft; and the detection unit is further configured to generate the frequency signal with a level changing constantly according to a frequency of change of a magnitude of the detection current.

13. The laser projection apparatus according to claim 12, wherein the frequency signal output by the detection unit is a digital pulse signal composed of a high-level signal and a low-level signal, wherein the low level signal is 0 V and the high level signal is 3.3 V; and the sensor is an infrared sensor.

14. The laser projection apparatus according to claim 1, further comprising a switch circuit, a power supply board and a laser drive circuit;

the switch circuit is electrically connected to the power supply board, the main control circuit and the laser light source; the switch circuit is configured to have the laser drive circuit on the power supply board provide a laser drive signal to the laser light source under control of the main control circuit; and the laser drive signal includes an enable signal and a brightness adjustment signal; and the laser light source is configured to emit a laser beam with a certain light emission timing in response to the enable signal, and emit a laser beam with a certain light emission brightness in response to the brightness adjustment signal.

15. The laser projection apparatus according to claim 14, wherein the laser light source includes a red laser, a green laser and a blue laser which respectively emit a red laser beam, a green laser beam and a blue laser beam and are respectively driven at different drive currents.

16. The laser projection apparatus according to claim 14, wherein the main control circuit is a microcontroller unit (MCU).

17. The laser projection apparatus according to claim 1, wherein the diffusion wheel driving circuit is integrated in a motor drive chip; the motor drive chip has an external resistor; and a resistance corresponding to a minimum drive current required to reach the target rotation speed is determined as a resistance of the external resistor of the motor drive chip.

18. The laser projection apparatus according to claim 1, wherein the main control circuit is further configured to first provide a first startup pulse width modulation signal with a relatively small duty cycle to the diffusion wheel driving circuit, and then provide the second startup pulse width modulation signal to the diffusion wheel driving circuit, wherein a duty cycle of the first startup pulse width modulation signal is less than that of the second startup pulse width modulation signal.

19. The laser projection apparatus according to claim 18, wherein a drive current corresponding to the first startup pulse width modulation signal and a drive current corresponding to the second startup pulse width modulation signal satisfy:

$$A2 = k \times A1,$$

where A2 is the drive current corresponding to the second startup pulse width modulation signal, A1 is the drive current corresponding to the first startup pulse width modulation signal, and k is a preset scale factor, which is a positive integer greater than 1.

20. The laser projection apparatus according to claim 1, wherein the laser projection apparatus further satisfies at least one of following requirements:

the optical path shaping lens being a converging lens;
the combining mirror group including a first dichroic mirror, a second dichroic mirror and a mirror;
the light collecting device being a light rod or light pipe; or
the light valve being a digital micromirror device (DMD) light modulation device.

* * * * *